(12) United States Patent
Lin et al.

(10) Patent No.: US 11,050,765 B2
(45) Date of Patent: Jun. 29, 2021

(54) SECURITY SYSTEM FOR MANAGED COMPUTER SYSTEM

(71) Applicant: Nicira, Inc., Palo Alto, CA (US)

(72) Inventors: Peixiao Lin, Santa Clara, CA (US);
Amit Chopra, Sunnyvale, CA (US);
Daniel G. Wing, Los Altos, CA (US);
Vijay Ganti, Cupertino, CA (US);
Christopher Corde, Burlingame, CA (US); Amit Patil, Pune (IN)

(73) Assignee: Nicira, Inc., Palo Alto, CA (US)

( * ) Notice: Subject to any disclaimer, the term of this patent is extended or adjusted under 35 U.S.C. 154(b) by 154 days.

(21) Appl. No.: 16/112,648

(22) Filed: Aug. 25, 2018

(65) Prior Publication Data
US 2019/0068622 A1    Feb. 28, 2019

Related U.S. Application Data

(60) Provisional application No. 62/550,580, filed on Aug. 26, 2017.

(51) Int. Cl.
| | |
|---|---|
| *G06F 9/455* | (2018.01) |
| *H04L 29/06* | (2006.01) |
| *G06F 21/55* | (2013.01) |
| *G06F 21/53* | (2013.01) |

(52) U.S. Cl.
CPC ...... *H04L 63/1416* (2013.01); *G06F 9/45558* (2013.01); *G06F 21/53* (2013.01); *G06F 21/552* (2013.01); *H04L 63/1441* (2013.01); *G06F 2009/45575* (2013.01); *G06F 2009/45587* (2013.01); *G06F 2009/45591* (2013.01); *G06F 2009/45595* (2013.01)

(58) Field of Classification Search
CPC . G06F 2009/45575; G06F 2009/45587; G06F 2009/45591; G06F 2009/45595; G06F 21/552; G06F 9/45558; G06F 21/53; H04L 63/1416; H04L 63/1441; H04L 63/14; H04L 63/1425
See application file for complete search history.

(56) References Cited

U.S. PATENT DOCUMENTS

| | | | |
|---|---|---|---|
| 10,291,654 B2 | 5/2019 | Banerjee et al. | |
| 2015/0146716 A1* | 5/2015 | Olivier | H04L 65/1006 370/352 |
| 2017/0235595 A1* | 8/2017 | Vankadaru | G06F 16/951 718/1 |
| 2019/0286833 A1 | 9/2019 | Takumi et al. | |

* cited by examiner

*Primary Examiner* — Olugbenga O Idowu

(57) ABSTRACT

A security system for a customer computer site includes a cloud-based manager (CBM) and on-site components. The on-site components include a manager appliance, guest agents of the CBM installed within respective virtual machines, and host agents of the CBM installed on hypervisors on which the virtual machines. The guest agents have a many-to-one relationship with the host agents, which have a many-to-one relationship with the appliance. In a scenario, many guest agents may generate alarms and send them to the host agents. Each host agent consolidates alarms across the different virtual machines it hosts and pushes the consolidated alarms to the manager appliance. The appliance batch processes the consolidated alarms across host agents, and pushes the batched alarms to the CBM, which deduplicates the alarms and notifies an administrator.

10 Claims, 24 Drawing Sheets

INVENTORY COLLECTION DATA FLOW 1200

APPLIANCE CONNECTS TO SITE MANAGER (vCENTER) & SENDS INITIAL INVENTORY ON BOOT
1201

↓

APPLIANCE SUBSCRIBES TO vCENTER INVENTORY UPDATES
1202

↓

SENDS ANY UPDATES TO MANAGER ONCE PER MINUTE
1203

FIG. 12

GUEST CONFIGURATION DATA FLOW 1300

APPLIANCE POLLS FROM MANAGER EVERY MINUTE
--ONE REQUEST PER vCENTER
--HTTP CACHING TO REDUCE LOAD & TRAFFIC
1301

↓

CACHED IN-MEMORY AT APPLIANCE & INDEXED BY GUEST
1302

↓

HOST MODULE POLLS FROM APPLIANCE
SINGLE BATCHED REQUEST FOR ALL VMs ON HOST
HTTP CACHING TO REDUCE LOAD & TRAFFIC
1303

FIG. 13

ALARM DATA FLOW 1400

HOST MODULE SENDS ALARMS SYNCHRONOUSLY TO APPLIANCE; (QUEUED ON HOST MODULE IF APPLIANCE UNAVAILABLE) 1401

APPLIANCE BATCHES ALL ALARMS OVER A TIME WINDOW 1402

APPLIANCE QUEUES ALARMS WHEN MANAGER UNAVAILABLE 1403

MANAGER DEDUPLICATES ALARMS 1404

FIG. 14

SECURITY SYSTEM FOR MANAGED COMPUTER SYSTEM

BACKGROUND

Enterprise applications, especially those that are Internet-facing, are vulnerable to intrusions of increasing sophistication. In fact, sometimes measures taken to secure an application present new vulnerabilities to attack. For example, an application can be disrupted by triggering a flood of alarms. What is needed is a new approach for defending against the variegated attacks.

BRIEF DESCRIPTION OF THE DRAWINGS

FIG. 12 is a flow chart of an inventory collection data flow.

FIG. 13 is a flow chart of a guest configuration data flow.

FIG. 14 is a flow chart of an alarm data flow.

DETAILED DESCRIPTION

The present invention provides for a multi-level application defense architecture including a cloud-based manager, an on-premises management appliance, host agents in hypervisors, and guest agents in virtual machines (VMs). The guest agents can monitor and control intra-VM processes and can issue alarms if problems are detected. The host agents can act as collection and fan-out sites for the guest agents. For example, alarms generated by 10,000 guest agents can be aggregated by 100 host agents. The (or each) appliance can serve as a collection and fan-out site for the host agents. For example, one appliance can aggregate the aggregated alarms from 100 host agents, so that alarms from 10,000 VMs are compiled into one bundle.

The appliance is a combination of hardware and software designed for secure communication with a cloud-based manager (CBM). The cloud-based manager, being external to the datacenter or datacenters, can be provided with up-to-date information regarding potential security threats. Preventative actions can be directed from the cloud-based manager to the guest agents via the appliance and host agents.

Figure 1:
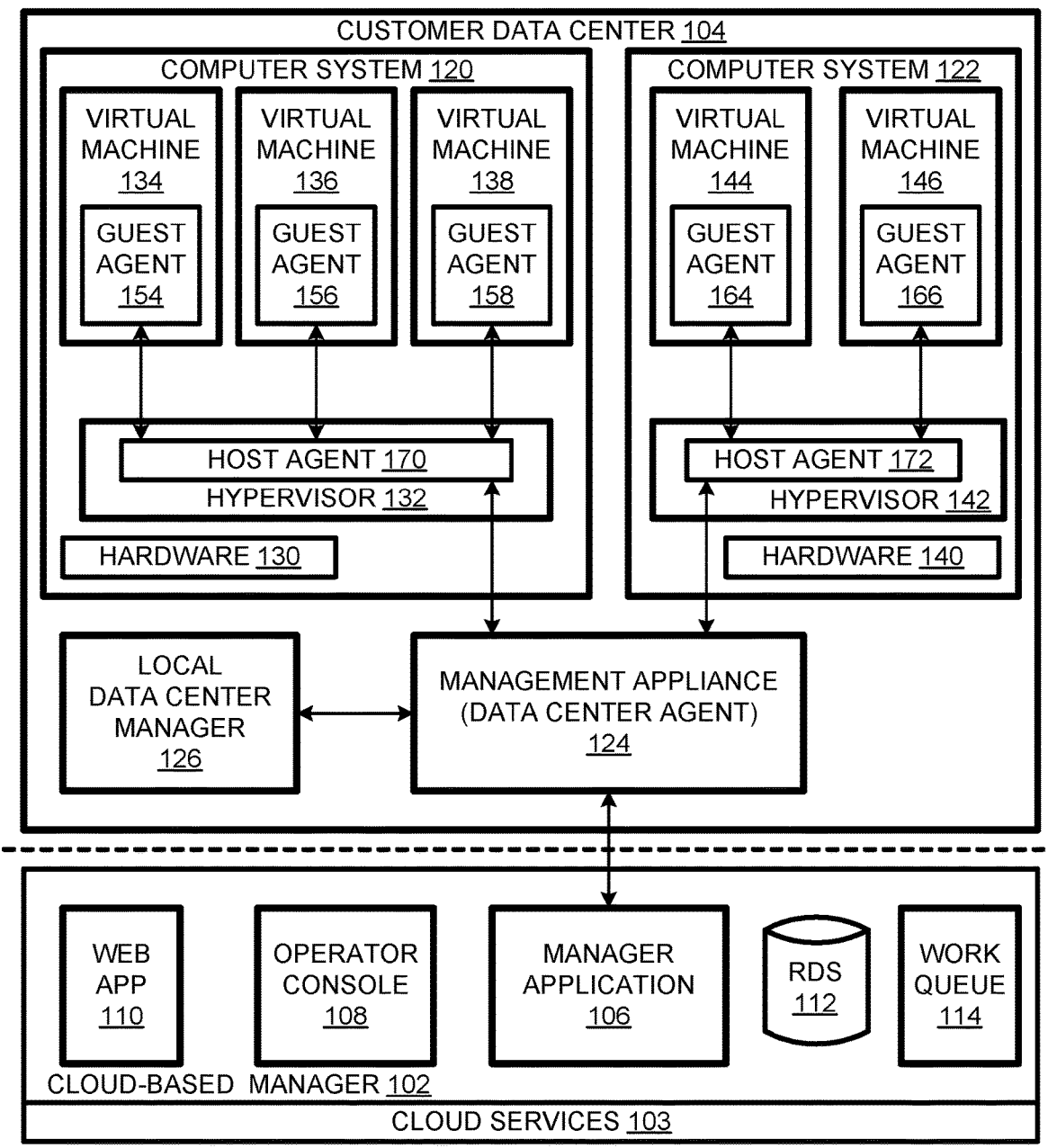
FIG. 1 is a schematic diagram of a computer management system.

As shown in FIG. 1, a computer management system 100 includes a cloud-based manager (CBM) 102 (supported by cloud services 103) and a managed customer data center 104. CBM 102 includes a cloud-based manager application 106, an operator console 108, a web application 110, a relational database RDS 112, and a work queue 114. Customer data center 104 includes computer systems 120 and 122, and a local data center manager 124. Also, on-premises is a vendor-provided management appliance 126, which serves as a local data-center agent for CBM 102.

Figure 2:
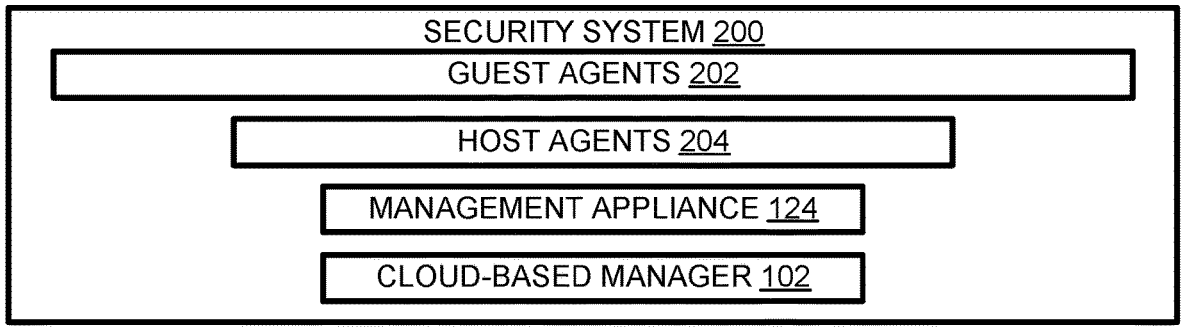
FIG. 2 is a schematic diagram of a security system of the computer management system of FIG. 1.

Computer system 120 includes hardware 130, a hypervisor 132, and virtual machines 134, 136, and 138. Computer system 122 includes hardware 140, a hypervisor 142, and virtual machines 144 and 146. From a functional standpoint, cloud-based manager 102, management appliance 124, host agents 204, and guest agents 202 collectively define a security system for managed computer system 100, as depicted in FIG. 2. In most scenarios, a data center would include many computer systems, each controlled by a respective hypervisor. Each hypervisor could support a single virtual machine up to thousands of virtual machines and beyond. The present invention readily scales to such larger data centers.

An administrator can manage data center 104 using CBM 102. The administrator does not need to be on premises of the data center, but can be remote and access operator console 108 via web app 110. The administrator can, for example, perform many management functions using a smartphone or other mobile device. Operator console 108 can be used to control CBM 106 to monitor and configure components of data center 104.

Figure 3:
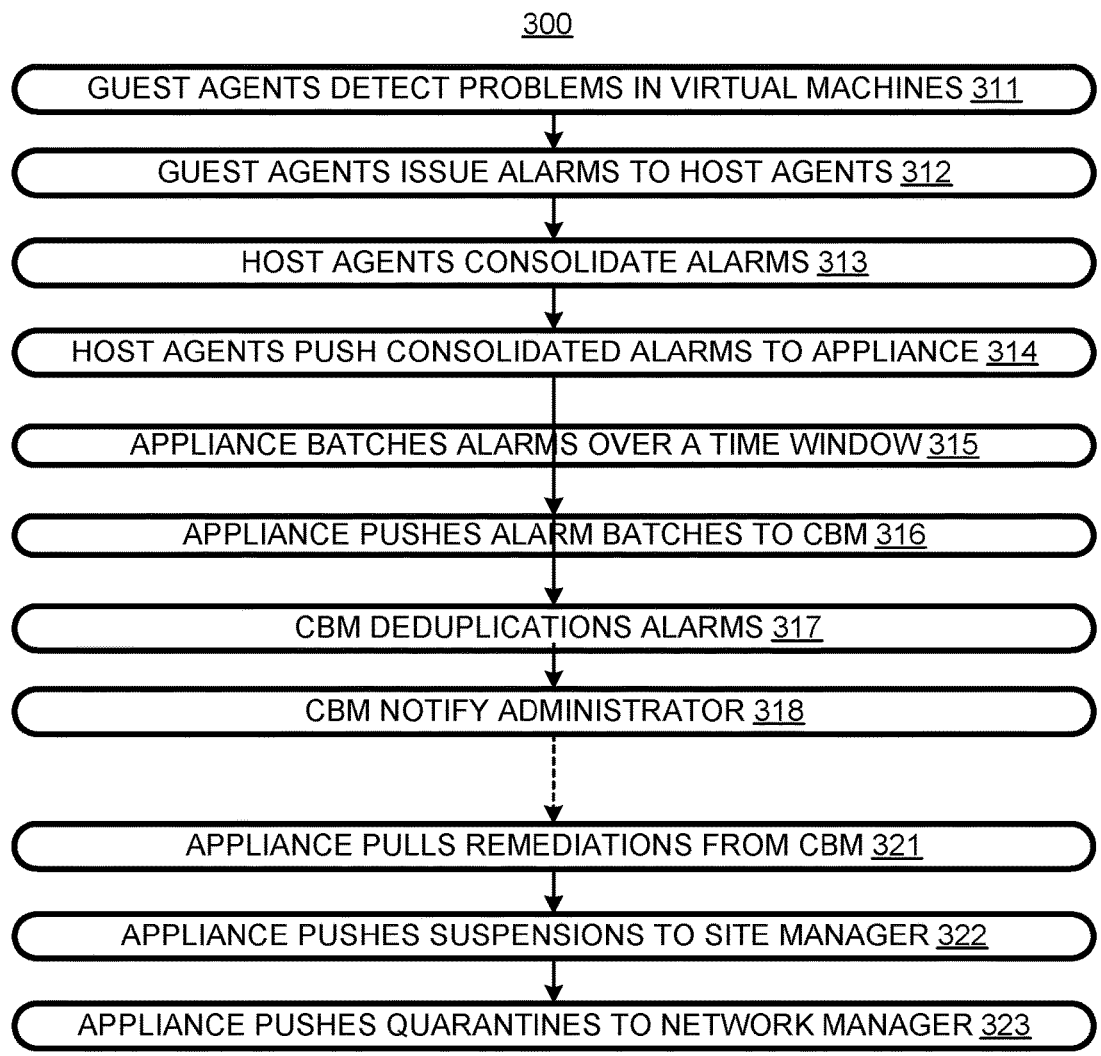
FIG. 3 is a flow chart of an alarm handling process implemented in the system of FIG. 1 and in other systems.

An alarm-handling process 300 is flow charted in FIG. 3. At 311, guest agents 154, 156, 158, 164, 166 respectively in virtual machines 134, 136, 138, 144, and 146, detect problems in their respective virtual machines. In response, at 312, each guest agent issues an alarm to its respective host agent. Guest agents 154, 156, and 158 issue to their respective host agent 170 in hypervisor 132; guest agents 164 and 166 issue to host agent 172 in hypervisor 142.

At 313, each host agent that receives alarms from plural guest agents, consolidates the alarms it receives. At 314, the host agents push their respective consolidated alarms to the appliance, e.g., over a physical network. The consolidation performed by the host agents greatly limits the network traffic caused by the large number of individual alarms.

At 315, the appliance batches consolidated alarms over a time window. At 316, the appliance pushes the batched alarms to the CBM. At 317, the CBM deduplicates the batched alarms. At 318, the CBM notifies an administrator of the alarms, e.g., in summary form after deduplication.

At 321, the appliance pulls remediations from the CBM. At 322, the appliance pushes remediations including virtual-machine suspensions to a site manager (e.g., vCenter) for implementation. At 323, the appliance pushed remediations including quarantines to a network manager (e.g., NSX). The site manager and the network manager are separate from the manager appliance but located in the computer site.

After receiving the alarms, at 317, the CBM deduplicates the alarms. For example, 50 alarms can be converted to a single alarm with a list of 50 virtual machines to which the alarm applies. At 318, the CBM provides a concise summary and analysis of the alarms to the administrator.

Computer management system 100 allows customers to define the intended behavior of their entire application in one place, and enforce that behavior using a least-privilege model for kernel integrity, process execution, and network connectivity. Guest agents, deployed in the customer virtual machines, along with supporting host agents run on the host hypervisors, monitor and enforce the configuration of each guest operating system and application. Management operator console 108 is provided to customers to define, apply, and monitor the enforcement of this configuration, and to monitor security events and alarms.

CBM 102 is the core application of the management plane, providing all customer-facing user interfaces, business logic, and workflow. This is a single-instance, multi-tenant web application hosted in the cloud, e.g., as provided by Amazon Web Services, Inc. (AWS). Appliance 124 is a single-tenant auxiliary service deployed in the customer's site. Appliance 124 acts as a fan-in/fan-out router between the host agents 170 and 172 and cloud manager 106, and also acts as the integration point to the on-site services. It presents a single, easily controlled security surface for ingress and egress of management plane data.

Security system 200 follows a service-oriented architecture. The two major services (cloud Manager and appliance) define versioned HTTP APIs as their primary interface and communicate with each other using those APIs. Communication with external services is also accomplished via HTTP APIs. Finally, the front-end application (a single-page web app) communicates with cloud manager 106 over HTTP APIs. Advantages of HTTP include current institutional usage, widespread high-quality client and server support, and rich protocol-level semantics for dispatch, status, messaging, and so on. Notably, HTTP and the computer management system generally do not use any message queue or message broker technology to communicate between components.

Security system 200 makes an explicit distinction between stateful and stateless components, and between stateful and stateless infrastructure within components. State maintenance has been minimized as much as possible in the design of data flows and APIs. Statefulness is an inherent obstacle to horizontal scaling, fault tolerance, failure recovery, and operability, so it has been limited as much as possible.

CBM 102 is stateful, as it is authoritative for all data in the system, but the only infrastructure components within CBM 102 that store state are the relational database 112 and the work queue 114; the other components that make up CBM 102 are also stateless. Appliance 124 and host agent 170 and 172 are each stateless. The only data persisted in these modules are their identifying configurations (a unique ID and API key), which can always be re-provisioned if lost.

The management plane design is optimized for the restartability of all components. This is a technique from Recovery-Oriented Computing that handles faults in any component by restarting them. Management Plane components do not require graceful restarts, and minimize the use of ephemeral state or long-lived connections to make their restarts as rapid and reliable as possible. Restartability and fault isolation is achieved at several levels in computer management system 100.

All business logic runs as threads managed by a process-level framework (e.g., Java Spring). Examples include an HTTP request running in a thread started by an application server, a client thread started by a scheduler, or a worker thread started by an event received from a job queue. In all of these cases, management system code is contained and managed by mature, third-party framework code.

Jobs, scheduled events, and HTTP requests are all designed to fail transactionally. In many cases this is accomplished via Structured Query Language (SQL) transactions. APIs and work items are also designed to be idempotent, so if they fail non-transactionally, they can be safely retried by their invoker. All management application processes have supervisory watchdogs to restart them on failure. All exceptions that are not handled at the thread level are fatal to the process, so it will be restarted by the watchdog (with a verbose error message).

Most hosting infrastructure is provisioned as a set of redundant resources. In the event of a host failure, infrastructure provided by the cloud-service provider restarts or re-provisions the lost host and fails over traffic to its peers. Applications expose health checks to the infrastructure to rapidly detect failures before they have significant customer impact.

The security system uses HTTP polling on many APIs. This is done for a few reasons: 1) minimization of state associated with long-lived connections, and need for "reconnection" logic; 2) customer site security (zero inbound network connections to Appliance); 3) simplicity of development. However, polling APIs can suffer from performance issues relative to well-designed "push" APIs. In order to mitigate this, the security system uses several techniques common in HTTP APIs: 1) Long Keep-Alive times for HTTP connection reuse; 2) caching headers that minimize data transfer when nothing has changed (primarily the use of Last-Modified, If-Modified-Since, Cache-Control, and Vary). This also makes the security system friendly to caching proxies. 4) Batching of small requests into large requests (primarily performed by the Appliance as part of its fan-in/fan-out logic).

The cloud-based manager is a true multi-tenant system: there is a single instance per region, running a uniform code base, storing and retrieving data for all customers. In order to maximize reliability and security, a reliable isolation model has been built for the cloud-based manager.

The Cloud Manager implements isolation in the application and APIs. Customer data is co-located in the same databases, data tables, and work queues. Every API is parameterized in the URL with a tenant identifier, which is required. Every API request includes an authorization header that also identifies a tenant, and this is cross-checked at the framework level with the URL's tenant ID. Every table in the database has a non-optional column recording data ownership. The product plan does not call for any cross-tenant data sharing, these controls can be enforced throughout the system; they cannot be opted out of by application code. The appliance is not a multitenant system—it can only send data to its configured tenant using a valid API key.

Our application framework (Java Spring) also provides comprehensive auditing of data changes in the Cloud Manager. Audits currently include the timestamp and author (a human or an integrated system) for each object creation, as well as modification and deletion information collected for some business objects. If customer requirements dictate, the auditing model can expanded to include full version control and modification data for every entity, performed at the framework level.

Regarding data retention, the management plane stores customer data in anonymized and non-anonymized formats. The procedures implemented properly retain customer data according to data retention policies: deleting data from tenants who are no longer using the system when necessary, and deleting old data from still-active tenants as required.

In the illustrated embodiment, the security system provides a multitenant management plane. An alternative embodiment has been designed for future implementation of a single-tenant on-premesis management plane. To enable this, a few design guidelines have been followed: 1) Comprehensive API versioning with backwards compatibility when possible; 2) Use of free and open source commodity infrastructure; 3) Avoid the use of "exotic" AWS infrastructure that would be difficult or impossible to replicate at a customer site (i.e. S3, DynamoDB); Simple reconfiguration of the appliance to use a different manager endpoint; 4) Isolation of manager state to make customer operations simpler.

The security system uses the Identity service from the VMware Common SaaS Platform (CSP). CSP Identity is a cloud-hosted API that provides a single global identity namespace. Using CSP makes it easy to implement federated identity, reduce boilerplate account management code, increase security (by outsourcing to their operations team), and provide SSO across other products using CSP (such as Skyscraper). The security system uses CSP for user identity, organizational identity, user role assignment, and organizational subscriptions. An embodiment also uses CSP for billing.

The security system depends on a local data center manager (e.g., vCenter) to gather inventory data on the customer's site. This inventory data is used for security scope assignment, guest readiness (based on OS information) and guest to host assignment. Goldilocks can also use vCenter to perform remediation actions in response to security events, such as suspending a guest. The Appliance connects to vCenter using its HTTP SOAP API.

NSX is used as an additional, optional remediation channel for security system 200. Appliance 124 uses NSX's HTTP REST API. Security system can receive "application context" data from vRA/vRO via a plugin. This plugin captures intended state information from a blueprint at provisioning time and sends it to appliance 124, which forwards it to the CBM 102.

Security system 200 can provide integration with CounterTack DDNA. The extension point for this integration is in the Host Agent. The security system is designed to easily support other integrations, by offering versioned, documented, simple and consistent HTTP REST APIs.

The Cloud Manager API is built and deployed using AWS Elastic Beanstalk. Elastic Beanstalk is a PaaS system for orchestrating Amazon's compute, networking, and storage infrastructure and coordinating deployment lifecycles. Using a PaaS minimizes operations and outsourcing as much commodity infrastructure as possible. Elastic Beanstalk decomposes nicely into regular IaaS components when removed, maximizing flexibility in future infrastructure changes.

The API code runs on EC2 instances. Java 8 on Amazon Linux can serve for OS and runtime. Elastic Beanstalk prepares hosts for deployment, deploys and supervises the security-system application code, and installs OS updates automatically during defined maintenance windows. API hosts run Spring MVC for the Java application server, fronted by an nginx instance provided by Elastic Beanstalk on the same host.

A fleet of worker instances runs the same code base as the API instances, configured differently. Instead of exposing API methods over HTTP, the worker instances subscribe to a series of SQS queues and poll for tasks. Workers accept a task, execute it, and record the results by writing data to the database or cache. The code on these hosts is also deployed by Elastic Beanstalk, which supports the "worker" role as a first-class abstraction.

Web application 110 that customers use to interact with the security system is a "single page" JavaScript web application, running the Angular2 framework. Most of the web application is compiled into a static bundle and delivered as a single download (including any assets) to the customer's web browser. Because the application is a single file, identical for all users, it is easy to host on a CDN for speedy and low-cost distribution, however it is currently being served by the nginx process on the API instances for simplicity.

The front end application authenticates to CSP using an OAuth2 flow, and is then given an API token (a JWT) that it uses to make subsequent requests to all APIs. This JWT contains the customer's identity, the tenant to which they belong, and the roles they possess, and is signed by a private key that the API instance controls to prevent forgery. See FIG. 33.

The front-end application is built using the Clarity visual framework, which saves the effort of building UI primitives for the security system and gives the security system a consistent look and feel with Skyscraper and other VMware products.

The chosen combination of AWS infrastructure enables simple horizontal scaling at most tiers of the application. Additionally: the API and worker instances can be trivially horizontally scaled, as they are stateless and do not use sticky sessions. The API clients are scale- and performance-friendly through the use of exponential backoff with random jitter on all API failures. This dramatically reduces the likelihood of overwhelming the security-system infrastructure and so that performance degrades gracefully when capacity is exceeded and there is need to scale.

The appliance infrastructure is much simpler than the Cloud Manager infrastructure; it has fewer scaling requirements, no need for durability to preserve data, and a very simple availability model. The appliance is: delivered as an OVF; deployed using vSphere as a guest on customer-operated hardware; deployed in vSphere HA mode for restartability on failure; running VMware Photon OS; running Java 8; and running a watchdog process to starts the Java application process and restart it if necessary.

The appliance requires some basic configuration when first deployed that allows it to discover and authenticate to the CBM and discover and authenticate to on-site services (vCenter and NSX). Various embodiments use one or more of the following for appliance configuration. OVF properties; a configuration UI (simple web console) hosted on the appliance; configuration files on the appliance filesystem.

The primary scaling factor for appliance 124 is the number of hosts and guests being managed by its connected vCenter instance. Appliance 124 can scale to as many guests as the largest supported vCenter instance size; if the customer has multiple vCenter instances, they will install multiple management appliances.

Figure 4:
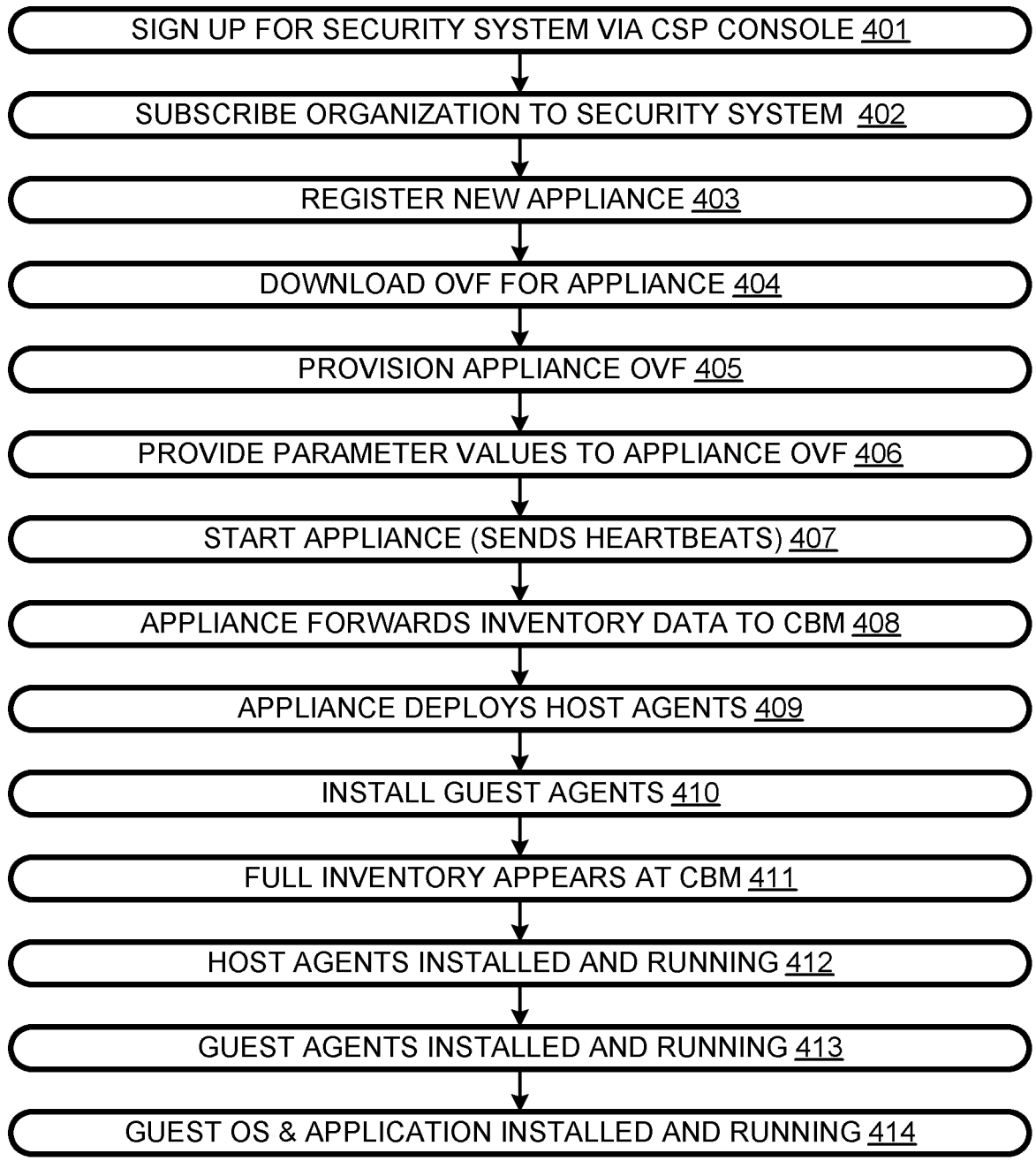
FIG. 4 is a flow chart of a process for installing components of the security system of FIG. 2.

A set up process 400, flow charted in FIG. 4, takes a customer from initial sign up to full operation. At 401, a customer can sign up for the security system by signing into the CSP console and set up their organization. At 402, they can then subscribe that organization to the security system. This will give them access to the operator console 108.

After signing up, a customer can begin the installation of the on-premises components (appliance, host agents, and guest agents) using a CBM-initiated workflow. At 403, the customer can register a new Appliance in the operator console, which creates a UUID (Universally Unique Identifier) and API (Application Program Interface) key for that appliance. At 404, the customer can download for the appliance an OVF. Open Virtualization Format (OVF) is an open-source standard for packaging and distributing software applications for virtual machines (VM). An OVF package contains multiple files in a single directory. Using the vCenter instance that will be managed, at 405, the customer can provision the Appliance OVF. At 406, the customer can provide parameter values to the OVF (e.g., API key, credentials for vCenter and NSX, etc.).

At 407, the Appliance starts up and begins sending heartbeats to CBM 102, which notifies customer. The CBM notifies the customer that their appliance has come online. At 408, the Appliance forwards inventory data obtained from the local datacenter manager to the CBM. In addition, the appliance can send health data for the local data center manager (which may include vCenter and NSX connections). At 409, the appliance uses the local datacenter manager to deploy the host agents to hypervisors. Some embodiments use EAM (Enterprise Asset Management) or VUM (VMware Embedded Update Manager) for this deployment. The appliance can also deploy unique API keys to each host agent to be used for authentication.

At 410, guest agents are installed on each managed guest, e.g., using VMware Tools. At 411, once the foregoing installations are complete, a full inventory of guests and hosts appear in CBM, along with information on "security readiness" of hosts/guests. In order for a guest to be prepped for the security system, it must have: 1) the host agent installed at 412 and communicating with the Appliance; 2) the guest agent installed at 413 and sending heartbeats to the respective host agent; and a (supported) guest operating system and application installed and running at 414.

Very large deployments are typically avoided: it is much safer to make many small, independent changes. However, in the event of a large or irreversible change, especially in a data migration, a change management process for deployments and rollback strategies is reviewed and signed off on before they go to production. Because the CBM is an always-on service for all of tenants, and because it is "in the loop" for alarms and remediation actions, there is no time for an "outage window" for a long deployment. The queuing behavior of the appliance makes it possible to take very short (e.g., less than two minutes) outages. Some embodiments of the CBM can support partial outages (i.e. read-only mode or remediate-only mode) to provide more flexibility for complex deployments.

The customer site security components (appliance, host agents, and guest agents) can be upgraded to a new release via a semi-manual or other periodic process initiated by the customer. The upgrade process is similar to the initial installation process; a new OVF is deployed by the customer; the new OVF detects the installed versions of host and guest agents and upgrades them in place.

The following conventions are followed to ensure consistency and make it easy for developers to develop and consume APIs. These conventions match VMware REST standards. All APIs are developed documentation-first. First a RESTful spec is written, including URLs, HTTP verbs, response codes, content types (if other than application/JSON), input and output document schema with examples, and any caching considerations. If the API implementation does not follow the spec, the implementation is incorrect or the spec needs to be updated. If an API is a breaking change to a previous API, it needs to get a new version number. APIs are developed with a common style guide.

All APIs follow basic RESTful principles. URL paths start with an API version number, i.e. /api/v1/resource_name. Object identifiers are put in paths, following the pattern.
/api/v1/resource_name/{id}/subresource_name/{id}

Use of query strings for parameters is avoided except for "filtering" parameters. Request bodies are avoided for query or filtering parameters, especially if doing so violates of HTTP verb semantics (i.e. using a POST instead of a GET just to put parameters in the body). Content-Type: application/json is used for all requests and replies. (This rule can be violated a semantically different type of document (for example an image) is being exchanged.

Semantically-appropriate HTTP verbs for the action being taken are used.
   GET—read-only
   POST—add a new resource
   PUT—replace an existing resource
   PATCH—update an existing resource
   DELETE—delete a resource The authorization header for credentials is used. All of the APIs use the format "Authorization: Bearer some_api_key". Caching headers (Last-Modified, If-Modified-Since, ETag, If-None-Match, Vary, Cache-Control) are used appropriately, and as liberally as possible. Semantically-appropriate HTTP status codes are used: 2xx for success, 3xx for success with redirect, 4xx for client error, and 5xx for server error. The most detailed response code available are used. A meaningful JSON body for error replies is included (however clients should not rely on this, and the structure of error bodies should not be part of any of the security-system protocols).

The security system provides diagnostics and monitoring to help customers do self-service troubleshooting of errors. The primary surface for customer troubleshooting is the system health console, which is located as a UI in the CBM. The health console lets a customer visualize the topology of their security system installation (the appliances, local datacenter manager instances, software-defined networking (SDN, e.g., VMware NSX) instances, host agents, and guest agents installed). The health console also provides health data on the nodes and edges in the topology graph. The information in this console is also available to security system vendor (e.g., VMware) operators to assist in troubleshooting if the customer needs additional help. Because the health console has a manager-centric point-of-view, it can include a simplified dashboard/console in the appliance for very basic troubleshooting if the appliance is disconnected from the CBM.

The on-site components write low-level log files for history and troubleshooting. These log files are not intended to be end-user serviceable—they are intended to be sent to a CBM vendor operator for further troubleshooting. As part of the deployment, install tools and scripts are installed to each component to capture the component's health and send it as a bundle to the security-system vendor's customer support. These scripts capture data including log files, snapshots of system state from the component's perspective, version information, component configuration, and potentially even heap dumps of running processes.

The CBM generates a number of diagnostic streams from its components, most of which are gathered and aggregated in AWS CloudWatch. Log files are centrally stored in CloudWatch Logs, and are generated by the security system's API and worker processes (running on EC2 instances). Application log files are tagged line-by-line with tenant information for easy searching and filtering, and log files are sanitized or tokenized wherever possible to protect customers' sensitive data. In addition, log files are generated by nginx servers (running on EC2 instances), the load balancers, ElastiCache instances, the RDS PostgreSQL databases, and the Elastic Beanstalk orchestration engine.

Performance information (API request rates and request latency, front-end request latency, work task latency, work queue depth) is published as time-series data to CloudWatch and X-Ray. Errors are collected from within security-system application processes (uncaught exceptions in API handlers or task workers) and the security-system front-end JavaScript and published to X-Ray, where they can be aggregated to monitor error rates.

Rich health checks from the load balancers to security-system instances detect errors quickly and take bad hosts out of service. HTTP errors are tracked from the load balancer's perspective and reported as a time-series uptime metric. A non-AWS uptime monitoring service is used to yield an external perspective on availability and uptime as a monitoring system of last resort.

The security system vendor can employ a 24×7 on-call rotation of operators who will be automatically notified by alerts in an event: 1) the CBM is unreachable; the error rate of the CBM has exceeded some predetermined threshold; a latency metric on manager API calls has exceeded some predetermined threshold; or the throughput of API calls to the manager is much higher or much lower than normal (indicating a flood of API requests or a widespread outage of appliances). The notification system also includes a secondary on-call and an escalation path. The on-call rotation does not extend to monitoring the appliance directly, and vendor operators are not responsible for proactively detecting and fixing a customer's broken appliance. However, however, vendor operators do cover scenarios in which a large number of appliances are no longer working due to a correlated failure.

Each of the components in the security system has different potential failure modes and recovery paths. The security system is able to detect them and limit the damage from a component failure. Each host agent repeatedly pings each associated guest agent. If the host agent detects a failure, it notifies the CBM (via the appliance). The CBM then notifies the customer.

Each host agent polls for configuration from the associated appliance. If an appliance has not heard from a host agent after several polling intervals, it notifies the CBM, which notifies the customer. If a host agent is trying to send alarms to the Appliance and it fails, the host agent queues the alarms in memory and retries (with backoff). This implies "at-least-once" semantics for alarm delivery, with some limitations. Alarms have a TTL, and the host agent abandon delivery of queued alarms that expire. The host agent's alarm queue is not durable, so if the host agent fails while it has queued alarms in memory, those alarms will be lost. If a host agent restarts or the ESX host reboots, the host agent continues using the configuration defined in the namespacedb, which should be retained through a reboot. Once the host agent comes back up, it queries the appliance as usual for any configuration updates.

The appliance polls for configuration from the CBM. If the CBM has not heard from the appliance after some timeout period, it notifies the customer. The appliance forwards alarms using the same queueing and retrying algorithm as the host module (described above), with the same delivery semantics and failure modes. The appliance also polls the CBM for remediation actions that need to be applied to NSX or vCenter. The CBM does not consider a remediation applied until the appliance acknowledges it, so if the appliance fails while a remediation is in flight, it remains in the incoming remediation queue and the remediation is reapplied.

Remediations have a TTL just like alarms, and if they are not applied after a period of time, they will be discarded. However, unlike alarms, there is no possibility of a loss of a remediation due to the failure of a non-durable queue; the remediation queue in the CBM is backed by a durable database.

The appliance regularly polls vCenter for inventory. If the appliance is unable to reach vCenter it notifies the CBM, which notifies the customer. If vCenter Connector fails while trying to send a remediation, it is queued as described above. Likewise, the appliance sends periodic pings to NSX. If the appliance is unable to reach NSX it notifies the CBM. If the NSX Connector fails while trying to send a remediation, it is queued as described above.

The appliance does not proactively ping vRA to check its health, unlike the other connected services. Instead, a vRA plugin failure is noted at provisioning time. When added to a blueprint, the vRA plugin can be configured in one of two modes: on a failure to communicate to the appliance, it can block the provisioning operation (thus ensuring that unprotected guests are not deployed) or it can allow the provisioning operation (allowing provisioning even if the appliance is experiencing an outage). The failure semantics are exposed to the customer because different modes will be appropriate for different customer workloads. The vRA plugin provides a manual "test connection" operation so customers can validate the connector configuration before a provisioning operation.

ELB provisions load balancers across availability zones (with a minimum of 2), and uses DNS entries with low TTLs to offer all available load balancers to clients. If one of the physical load balancers fails, clients using its IP address fail. When those clients retry, they may get the "bad" load balancer again, or they may randomly failover to a good load balancer. This appears as an elevated error rate from the perspective of front-end monitoring by the security system. AWS's health checks will notice the load balancer failure and remove it from DNS. Because the DNS has a low TTL, after a short period of time, clients no longer see it, so clients should retry requests (with backoff) until they succeed.

Each Amazon Elastic Compute Cloud (EC2) instance is individually health checked by the load balancers fronting it and will be taken out of all load balancers if a number of consecutive health checks fail. Requests currently being executed by a failing instance will fail, but will fail transactionally (because of the use of request-spanning DB transactions)

All of the security system's APIs are idempotent in the case of retry, in case of partial failure, or in the case of failure to return a success code. If an instance experiences a hardware failure, Elastic Beanstalk automatically replaces it. If it experiences a software failure, the instance is not replaced; rather, it remains quarantined from the load balancer, and Elastic Beanstalk sends a warning to the security system operator. If a significant fraction of instances are unhealthy, Elastic Beanstalk will elevate this warning to an error and notify an administrator again.

Memcache usage follows a "pull-through" model, meaning that the cache is not authoritative for any data, and cache clients always have the logic and data to recompute the contents of any cache key on the fly. This means that the cache is non-authoritative and has no expectation of durability. Cache failures do not cause customer-facing errors. Cache instance failures are automatically replaced by AWS infrastructure, and failover from bad cache instances is performed with DNS (similar to the load balancer failover).

Amazon Simple Queue Service (SQS) is a fully managed message queuing service that enables you to decouple and scale microservices, distributed systems, and serverless applications. SQS eliminates the complexity and overhead associated with managing and operating message oriented middleware, and empowers developers to focus on differentiating work. Using SQS, you can send, store, and receive messages between software components at any volume, without losing messages or requiring other services to be available. Get started with SQS in minutes using the AWS console, Command Line Interface or SDK of your choice, and three simple commands.

SQS availability is managed by AWS internally. SQS operates cross-AZ and failover is transparent to us. Historically SQS has had extremely high uptime, but AWS does not offer an SLA for this service. In the event of an outage: API requests that do not enqueue batch jobs will continue to succeed (currently the majority of requests). API requests that do kick off batch jobs will not be able to enqueue requests, which will result in 500 errors for those API methods. Any timers or internal scheduled events will fail because they dispatch tasks to workers. Workers will not be able to process requests, so batch operations are stalled (or potentially be lost, if SQS incurs data loss).

Workers pull requests from SQS in priority order as quickly as possible. If a worker fails, other workers continue to operate. At least two workers are provisioned at any given time. Elastic Beanstalk and Auto Scaling manage the worker instances the same way they manage the web instances: in the event of hardware failure, they will be replaced, and in the event of software failure, the security-system operator receives a warning or error message.

Amazon Relational Database Service (Amazon RDS) is a web service that makes it easier to set up, operate, and scale a relational database in the cloud. It provides cost-efficient, resizable capacity for an industry-standard relational database and manages common database administration tasks. RDS manages a pair of PostgreSQL databases for us. This is a master-slave pair in different AZs with synchronous replication. If RDS detects a failure of the master, it performs a DNS-based failover to slave, restarts or reprovisions the master, and converts the failed master into a slave.

In the context of API throttling and deduplication, failures can also be caused or aggravated by heavy system load. The security system is designed for constant request rates in the steady state and uses client- and server-side throttling to shed load in exceptional states. Most of the dataflows in the security system follow a polling and batching model that results in a steady request rate to other systems. The appliance polls the CBM for configuration once per minute, and the host agents poll the appliance for their subset of the configuration once per minute. The appliance also polls for pending remediations at the same cadence, and sends back remediation results in batches.

The dataflow for alarms is slightly different, in order to minimize alarm latency but also mitigate alarm "storms". When an alarm is generated in the host agent, it is sent immediately to the appliance. The Appliance receives the alarm and stores it in a queue. After a "cool-down timer" (during which other alarms can also be queued) all alarms are forwarded in a single batch to the CBM. The CBM deduplicates alarms by alarm type. Deduplication tends to be effective because there are only a few possible alarms types and variations possible in the security system. On the server side (both in the appliance and the CBM), throttling is employed on both authenticated and unauthenticated API requests. In an embodiment, AWS Shield (a DDoS protection proxy) provides throttling on unauthenticated requests.

AWS RDS automatically takes snapshots of the security-system database and saves them to S3. In the unlikely event of production data loss, these snapshots can be used to restore the database. Quarterly "game day" events can be used to test and validate the restoration procedure in the staging environment. Backups are mirrored to a VMware-internal durable store in case of catastrophic failure or loss of access to the S3 backups; the durable store can be included in the game-day quarterly tests.

If a customer Appliance experiences a catastrophic failure, and cannot be recovered by vSphere HA, the security system operator provides instructions and tools for the customer to replace the appliance with a new instance. The data on the appliance is ephemeral, so the cost of losing it is minimal. In an embodiment, Appliance's configuration can be backed up for faster restoration of service (no need to reprovision API keys and certificates for the appliance, host agents, and connected services).

During an appliance failure, host agents are impacted; they will not be able to receive new configuration from or forward alarms to the CBM and remediation actions that require NSX or vCenter are not applied. Host agents will continue to log alarms, so customer log aggregation and monitoring software can be used as a alerting system of last resort while the Appliance is being restored.

An AWS Availability Zone (AZ) is a datacenter with shared physical space, power and networking. It is possible for a failure to take down an entire AZ in one event; this has happened several times before and AWS advises customers to plan for this possibility. Every service the security system runs within AWS is either natively built to handle AZ failure (in the case of shared services like SQS, Route 53, S3, etc.) or can be configured in a multi-AZ mode by the customer (RDS, Elastic Beanstalk).

If an AZ fails, approximately half of computing capacity and also to experience failovers at several points in the security system. There may be short (less than one minute) partial outages of the DNS, load balancers, and queue, which can self-heal. There may be elevated error rates, latency, or increases in work queue depth due to the additional load on the remaining compute instances. If the failing AZ contains a slave database instance, an alarm but should issues, but there should not be a noticeable service disruption. If the failing AZ contains the master instance, there may be a short outage of the same type as the DNS, load balancer, and queue outages.

In the event of an availability zone (AZ) failure, operators should look to AWS's status pages to determine the severity of the failure and expected time to recovery. In most situations, the best thing to do is nothing—if an application is still functioning properly, taking emergency action just risks creating a new failure. However, if AWS indicates that the AZ recovery will be prolonged or that the AZ will not recover, security-system operators can start to carefully reprovision infrastructure in a new AZ to return to a redundant state.

A failure of all the availability zones in a region is rare but not impossible. In order to recover from region failure (or from operator error that causes loss of a significant chunk of the AWS infrastructure) there is a document and/or set of scripts that can be used to spin up the security system in an entirely new AWS region, and restore data from on-site or off-site backups. Depending on the scenario, either Amazon's Route 53 DNS (if it is functioning) or VMware IT's DNS can be used to fail over to the new region so appliances can reconnect to the CBM.

The customer can access the failure semantics of the vRA plugin directly, to let them decide what is appropriate for their workload. The appliance does not directly call any vRA APIs, nor does it participate in vRA workflows unless it is actively configured, so there is minimal risk of a failure in the appliance breaking vRA in unexpected ways.

The security system calls vCenter APIs to perform provisioning, subscribing to inventory updates, and remediation. Provisioning the host agent and guest agent on installation. This is the highest-risk workflow for the appliance in terms of potential impact to other systems. The appliance uses vCenter to make fleet-wide changes in the customer's site; performing these changes incorrectly could result in a very large outage. Customers are given ability to test deployment on a limited set of hosts and to roll out the security system in stages to limit the damage from a bad rollout.

The appliance polls for new inventory data from vCenter using the standard APIs. The data collected is minimal and the polling is infrequent, so the risk from this action is low. The inventory collector throttles and backs off in response to vCenter errors, and appliance restarts will be throttled by the supervisor process to ensure overload vCenter is not overloaded if the Appliance is stuck in a restart loop.

The security system provides for performing certain configured remediation actions in response to alarms. The appliance can use vCenter APIs to suspend guests in response to alarms. Unapplied remediations are timed-out to ensure that an "old" remediation stuck in the system is not applied long after the fact. Some embodiments employ an appliance-level throttle on remediation application rate to minimize the risk to customer infrastructure if there is a bug in remediations or a malicious actor is able to inject fake remediations.

The NSX connector is similar to the vCenter connector when it comes to limiting adverse impact. There are two workflows from the Appliance to NSX: creation and remediation. At appliance boot time, a set of tags is created or, if they already exist, their presence is verified. Security groups in NSX that will be used for remediations in the future. Since these are only called at startup, and appliance restarts are throttled, this API has a limited invocation rate. To perform a remediation, a guest can be added to one of the predefined security groups, thus quarantining it. As with the appliance, remediations have a TTL that ensures that old remediations are not applied when they are no longer valid, and any remediation throttling.

vMotion is not a failure mode, but it is an interesting point of interaction between the security system, vCenter, and NSX that must be addressed. Guests monitored by the security system are restricted to only move to security-prepped hypervisor (ESX) hosts. The security-system configuration for a guest is put in place on a new host agent before vMotion completes. Guests can be moved "into protection" via vMotion actions from unmanaged ESX instances to managed ESX instances. This use case is especially relevant for Skyscraper, where there is the possibility for customers to vMotion unprotected on-premises guests to protected AWS-based ESX hosts.

As a cloud-based system, the security system needs to be particularly careful to secure all endpoints, data stores, and infrastructure against threats. Accordingly, the security systems has several cross-cutting security rules in place, including: end-to-end TLS encryption and mutual authentication for all HTTP APIs in the system, including internal APIs; unique, authenticated identities for all human and non-human principals in the system (including the appliance and host agents); framework-level auditing of data created in the CBM; at-rest encryption of all durable data; defense-in-depth for cloud resources and endpoints; and least-privilege access for operators to cloud resources.

Every principal in the security system has a unique identity; each appliance has a UUID that is assigned by the CBM, each host agent has an identifier assigned by the appliance. Servers that expose APIs (the appliance and CBM) have certificate thumbprints that act as their identifiers. In each HTTPS API call, the client authenticates the server by checking either the server's SSL thumbprint or the CA certificate chain (depending on configuration). The server authenticates the client by checking an API key in the authorization header.

Current versions of TLS will be used for all APIs. Plain HTTP is unsupported, except as a redirect to HTTPS for web browsers. Within and between AWS services, a similar mode is followed: all requests use TLS and verify hostnames using Certificate Authority (CA) certificates (no thumbprint verification is required within AWS as there is a working CA hierarchy in all cases). Requests to AWS services use access keys and secrets keys provisioned by AWS IAM. In addition to the connection authentication and encryption, defense in depth is provided at the network layer by using AWS VPC, a software-defined network that co-locates all of the security-system's resources in a private subnet, and AWS Security Groups, an instance-level firewall that limits port access to registered endpoints.

There are additional security measures in place to prevent browser-based vulnerabilities. X-Frame-Options are enabled to prevent clickjacking. Angular2's template rendering is used to sanitize output and prevent cross-site scripting (XSS). Cookies are not used for authentication, so the security system is not vulnerable to cross-site request forgery (XSRF). HTTP Strict Transport Security (HSTS) is used to force browsers to always make a secure (HTTPS) connection to the server. Cross-origin requests are not used (the front-end will have the same origin as the API) so there is no need to support cross-origin resource sharing (CORS).

The RDS database is the master durable store for all security-system data. All data in RDS is encrypted at rest using AWS's built in key management and rotation systems. Data is temporarily stored in SQS and ElastiCache as well, but, in the illustrated embodiment, is not encrypted as it is short-lived and hosted on AWS-operated infrastructure. In an alternative embodiment, this data is also encrypted.

Several components in the security system generate log files that are saved for a period of time in AWS CloudWatch. Logs generated from the database and load balancer do not have customer-proprietary data in them. Logs generated by security-system application instances (API and Worker) may contain proprietary data; framework code is used to sanitize log entries and tokenize identifiable data (such as customer names, scope names, and IP addresses).

Infrastructure Security Cloud hosting exposes a secondary attack surface—an attacker gaining access to the AWS console or API and directly sabotaging or stealing data from the cloud infrastructure. There are a number of things done to mitigate this risk. AWS Identity and Access Management is used for all user accounts and API keys that have access to the security-system infrastructure. This allows audit access at a fine-grained level and easy revocation access on termination.

Appropriate roles are defined in the AWS tools; operators are restricted to the least privilege needed for their function. Direct SSH access to EC2 instances and direct PSQL console access to PostgreSQL are locked down. This limits the ability for attackers to guess credentials, and makes it less likely to cause a self-inflicted outage through operator error. In an embodiment, federated sign-on to the AWS Console using VMware corporate credentials (via SAML/vIDM) is provided. Depending on the embodiment, IP whitelisting or a point-to-point VPN is used to allow access to certain operator tools from only VMware corporate networks.

This combination of AWS infrastructure enables simple horizontal scaling at most tiers of the application. The ELB load balancer is self-scaling based on traffic in both horizontal and vertical directions, and has been benchmarked at least 10 k SSL requests per second. SQS, which supplies jobs to the worker instances, is a single instance per region fully managed by AWS, and has been benchmarked at 15 k message sends per second and 4 k message receives per second. RDS cannot be trivially scaled horizontally, so the primary strategy involves vertical scaling as needed. RDS supports extremely large dedicated hardware, if needed; the largest instances offer 32 CPUs and 244 GB of RAM. In addition, the IOPS available to RDS can be scaled independently, so the database can be sized to match the mix of compute, data size, and read/write rate requirements.

RDS offers read-only replicas as an initial scaling technique for increasing read throughput with minimal application changes. Security-system data is easily partitionable/shareable by tenant. Also, data can be split into different logical stores and optimized based on their performance characteristics (configuration data is read heavy, often updated, while alarm data is write heavy and append-only). ElastiCache can be easily scaled horizontally using key-based partitioning on the client. Because Memcache is a simple key-value store with no joins, partitioning is trivial.

Capturing and updating the intended state of the application is critical to providing robust detection and protection of modern dynamic and distributed applications. Deviations from this intended state are a strong indicator of either adversarial intrusion or unauthorized change. Most traditional solutions have focused on purely whitelisting the processes that run on a single machine and have not focused on behaviors exhibited by these processes, which may vary according to context. For example, the same apache binary may exhibit different behaviors in different application context. The intended state information includes both the context and behavior information of the application but may include other information.

Some example categories of intended state information include: application business information; intended regulator classification (this information indicates any regulatory applicability of the intended application/service); intended application criticality; application identity information; intended application/service (e.g. WordPress, Drupal, JOOMLA, MySQL etc.) identified by service name, service types, vendor information, version information; application composition information; constituent components (this information is useful to determine all known vulnerabilities (CVEs) within components used to build and application/service); application deployment and architecture information; network blueprint/container composition topology (this information indicates the intended communications paths between the services that make up a distributed application as well as includes details of scaling, replication, backup architecture, this may also include the privileges of different processes and permissions for parts of file system); application behavior information; intended external communications interface/port (this information indicates the consumption interface, protocol, port of an application/service/container service); and intended system service calls (this information indicates the system service calls that the application/service should make (and by their absence, should not make)).

This invention makes it easier for security, infrastructure and application teams to review and verify the intended state of an application: 1) by automatically pre-verifying processes and behaviors within the broader application context; and 2) by presenting data about processes and behaviors that allows users to understand the implications of the processes and behaviors they are reviewing.

Generalized application behaviors and processes are abstracted from observed behavior so that they are resistant to normal and expected variations across process instances (e.g., the same process may talk to two different IP addresses in different deployments even though they are exhibiting similar behavior).

Enforcement rules for applications and processes are inferred so that e real alarms can be separated automatically from intended behavior. For example, a process when observed in one instance may talk to four IP addresses. If this behavior is captured in the raw form and enforce them "as-is", when the process communicates to five IP addresses, it will generate an alert. One abstraction of this behavior would be to say that a process that talks to more than one IP address during observation period can talk to multiple IP addresses. This would result in elimination of alarms due to the fifth IP address. On the other hand indiscriminately permissive policies can create a security risk. Determining the abstract rule so that low noise is balanced with security, is critical metric for the success of the abstraction Making it easier for security and application teams to separate valid changes that are done out-of-band from undesired changes. For example, a software component that is patched will result in an alert because the system will observe behavior from a new/unknown entity due to a change in hash of the binary. While a rule based approach may look at the product and version from the certificate or the binary header information to ignore that change, an ML-based approach that looks at a wide range of features inside and outside of that machine to determine if the change is likely to be valid or not. This will dramatically reduce the burden associated with processing too many alarms.

The present invention uses deviation from intended process behavior in a specific application context as a strong detection signal for a security incident or an unauthorized change. This context is captured by various dimensions of the parent application including but not limited to composition, architecture, business, deployment and identity information.

Machine-learning (ML) techniques are used to determine the process context. For example, a process context using a rules-based approach may specify presence of a few specific tags or variable values, like security groups or application tags as identifiers of a context. In an ML driven approach a multitude (hundreds of thousands or millions) of features that are part of a machine learning model identify process context. These features may include, but are not limited to, abovementioned tags, other processes and their behaviors on the same machine, processes and their behaviors on other machines that communicate with this machine.

Process behavior is defined in an abstract fashion (towards the goals stated above). This abstract behavior is extracted programmatically from raw observed behavior. AI/ML techniques are used to create and test different abstractions for effectiveness (as measured against the stated goals).

Mechanisms are provided for comparing different process instances based on their abstract behavior including using AI/ML techniques to do this comparison. A variety of similarity measures are used spanning both continuous (for example, similarity or distance measures like Cosine measures, Jacquard Measure) and categorical variables (e.g., Eskin measure, Lin measure). Historical data of behavior abstractions and associated meta data are used to recommend the closest class match to a user. Embodiments can include any of the traditional supervised classification techniques like SVM or may use neural network techniques.

A process's intended state pre-verification is evaluated based on the cluster of processes it's part of. A wide range of models are used in this including manually defined models, machine learning models and advanced neural network models. A process' intended state pre-verification is evaluated based on the process behavior of the neighboring nodes of that machine/service. ML/AI is used to capture user inputs to continuously re-calibrate both the features and their weights that make up the evaluation model.

Multiple security levels are provided as user options to policy enforcement. These options serve as input signals to the model resulting in, for example, a range of policies spanning permissive to restrictive settings.

ML on context data for the application is leveraged to automatically distinguish valid changes to the application from non-authorized changes. For example, if a change is observed on one machine, the absence of a similar change on other machines with the same role may be a strong signal for unauthorized change. Similarly the presence of similar change across a large number of machines that span applications and possible customers within a specific time frame may be strong signal that it is a valid change. The heuristics based approaches are brittle but ML based model are malleable and can adapt to changes over time.

The multilayer architecture: Cloud Manager—Appliance—Host Agent—Guest Agent is worth trying to get broad protection on a combination of white listing and this architecture, especially as applied to tiered apps. For example, the use of a correlation between behaviors of processes running in different data centers to develop a connectivity baseline and to detect anomalies for at least one of the processes. The use of deployment specifications to generate white list items. Deployment specifications may be from deployment blueprints, lifecycle blueprints, puppet, chef, deployment scripts, and CLI arguments upon launch of a process image.

The use of behavior discovery/analysis to generate baselines for white lists. New process that belongs to a class for which a behavioral baseline has been established. Thus, the example that discovery can be avoided when scaling out. As enhancements, the use of discovery to classify new processes and the use of machine learning to define the classes.

The use of behavior correlations to characterize process behavior. Included an aspect of this in the architecture invention, but it is worth consideration on its own as the architecture application would not cover all cases, e.g., cases where both processes are in the same data center. The use of a host agent to characterize processes running on that host, eventually to eliminate the need for a guest agent.

Upgrade (and other pipeline) awareness to avoid false detections of anomalies. Use of carbon black and other services and resources to recognize that a hash change may be due to an upgrade and need not reflect an anomaly or require a change in the whitelist. Starting up more processes than have failed in anticipation of additional failures. Probably best included as a remediation alternative in one of the other applications.

Operating system and application vulnerabilities let an assertive attacker divert the functionality of an operating system. Once gaining execution control in root mode, it may create a persistent state to get continued root access to the system and hide itself from getting detected by the scanning tools. Such a behavior is termed as Rootkit. The primary problem is to be able to determine when an operating system has been tampered with and provide notification and/or mitigation mechanisms.

The solution described below provides a mechanism that is assisted from outside the OS and enables an ability to provide sufficient integrity for a Guest OS. The mandatory observation is that the beginning OS image and its loading must be trustworthy.

Simply speaking, the notion is to build an external verifier to a VM which will have the ability to track changes to both the NTOSKernel as well as signed 3rd party drivers (mandated by Windows regardless). By tracking changes and/or preventing changes to these areas, a rootkit is not be able to execute and/or hide itself from being detected.

Figure 5:
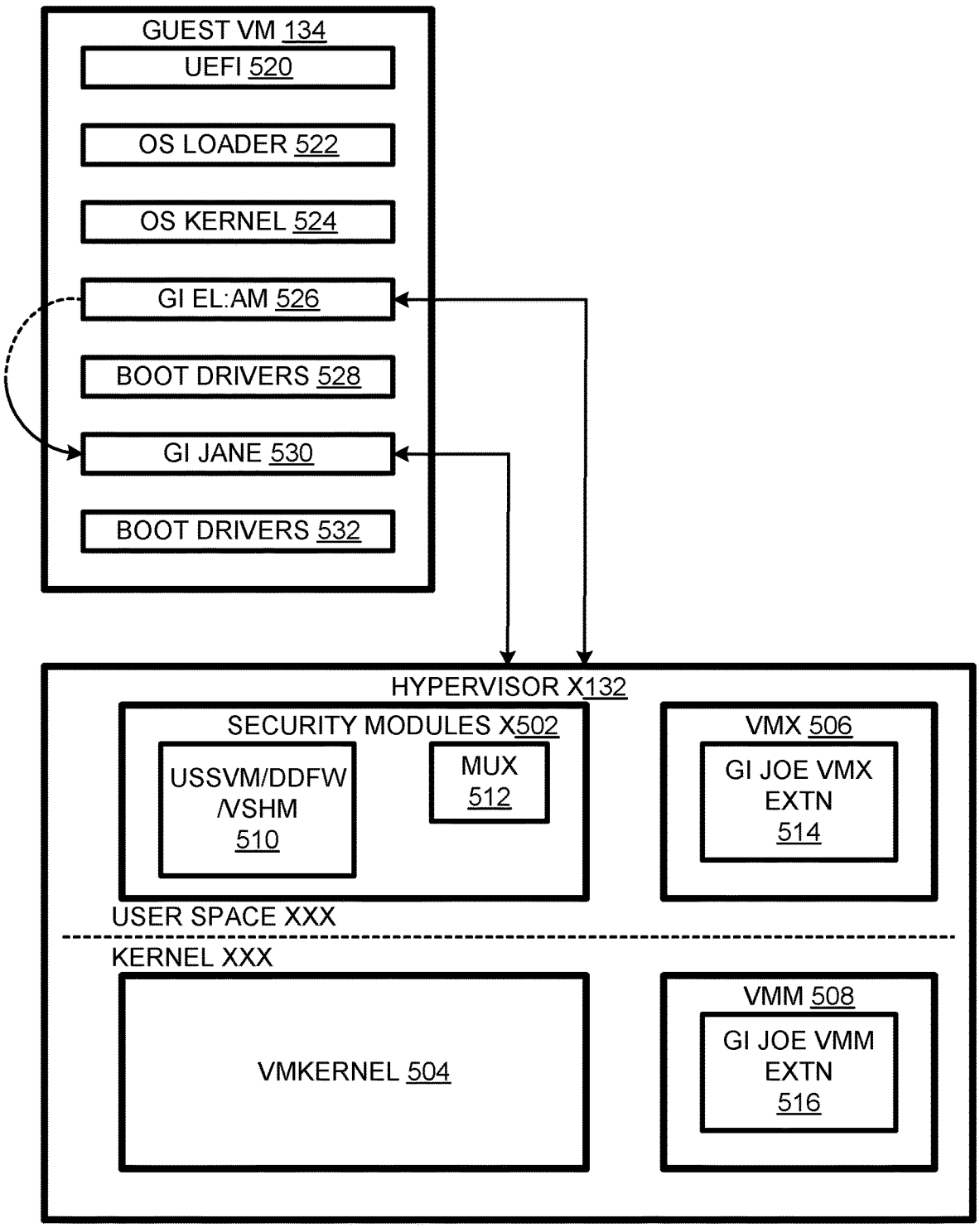
FIG. 5 is a schematic diagram of components of the system of FIG. 1 used for secure booting a virtual machine.

The logical diagram of FIG. 5 details a guest VM, e.g., VM 154, and a hypervisor, e.g., hypervisor 132 (ESX) that hosts the VM. Hypervisor 132 includes security modules 502, a VM kernel 504, VMX 506, and VMM 508. Security modules 502 include USVM/DFW/VSHM 510 and a multiplexer (MUX) 512. VMX 506 includes a GI Joe VMX extension 514. VMM (virtual machine monitor) 508 includes a GI Joe VMM extension 516. Guest VM 154 includes UEFI 520, OS loader 522, OS kernel 524, GI ELAM 526, boot drivers 528, GI Jane 530, and boot drivers 532.

At startup, GI ELAM 526 locates critical kernel data structures, requests traces on base guest OS (Windows) kernel, and registers boot driver notification with the guest OS. GI ELAM 526 provides a boot driver notify routine, and can handover state to GI Jane 530 and unload. At startup, GI Jane 530, re-establishes traces with hypervisor, registers periodic call back with hypervisor, and registers process, thread, module load/unload notification with the guest OS. GI Jane 530 implements periodic callback routine for reconciliation checks. GI Jan 530 implements process, thread, module load/unload notification routines. Hypervisor 132 performs read/write/execute traces, sends notifications in response to page table modifications, applies digital signature verification, provides periodic callbacks to guest, and provides a guest protected domain.

Figure 6:
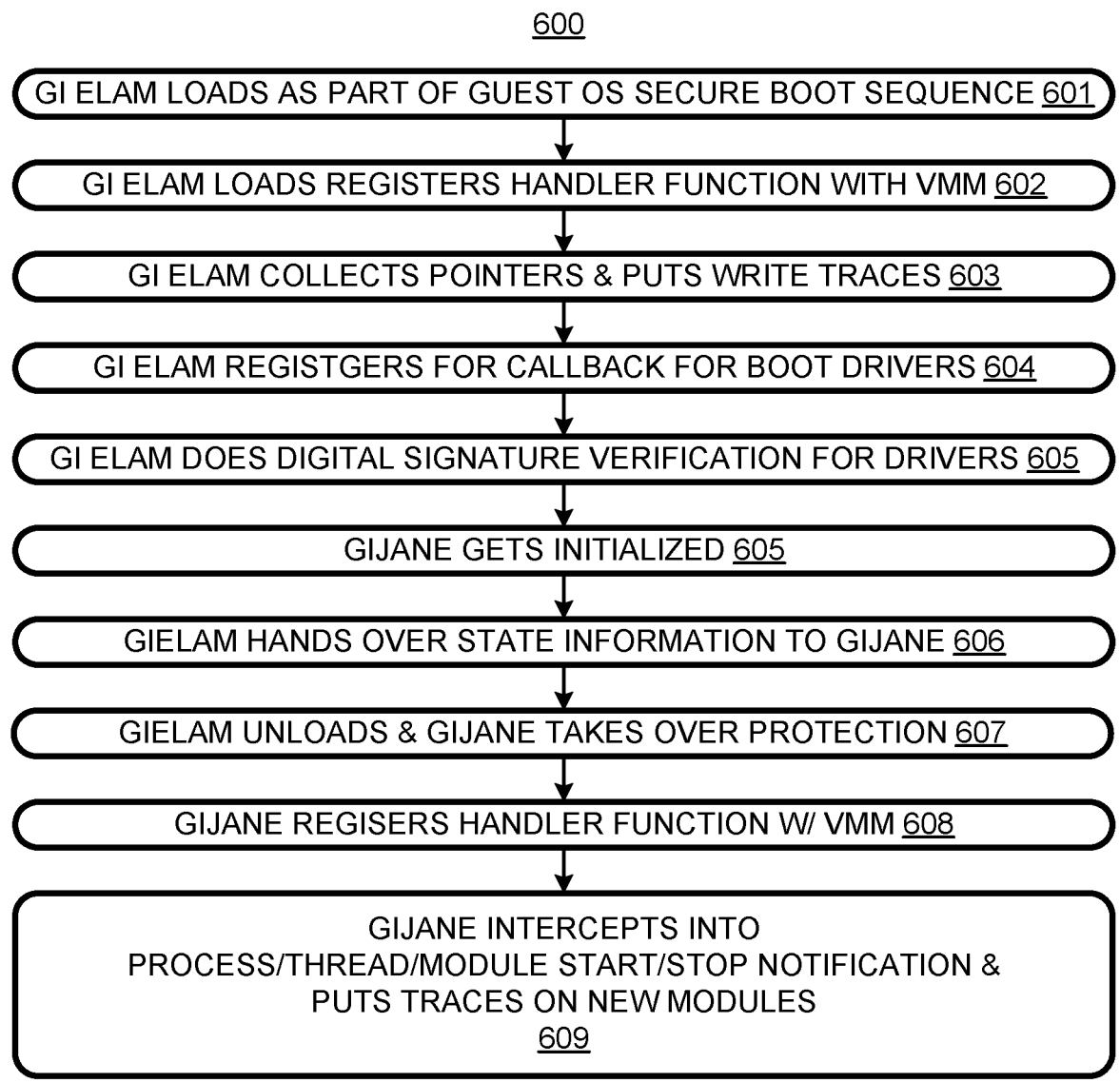
FIG. 6 is a flow chart of a secure boot process used in connection with the components of FIG. 5.

An initialization process 600 is flow-charted in FIG. 6. At 601, the GI Elam loads as part of the guest OS secure boot sequence. The system is assumed to be in a well-known secure state through the chain of trust established by the secure boot. At 602, GI Elam registers a handler function (e.g., IntegrityChecker) with the virtual machine monitor. At 603, the GI Elam collects pointers to critical static kernel data structures and puts write traces on various code regions of the kernel and data structures that are never expected to change during the lifetime of the operating system. At 604, GI Elam registers a notification to get callbacks for various boot drivers as they are getting initialized. At 605, GI Elam performs does the digital signature verification for the drivers as they are initialized and puts a write trace on code regions of these drivers.

At 606, the GI Jane also gets initialized and it waits for the GI Elam to finish its duties and get unloaded. Before unloading, GI Elam unregisters the handler function with the virtual machine monitor. At 607, when GI Elam unloads, all the state information is handed over to the GI Jane and the protection is taken over by GI Jane. At 608, GI Jane registers a handler function (e.g., IntegrityChecker) with the virtual machine monitor. At 609, GI Jane intercepts into process/thread/module start/stop notification and puts traces on newer modules that are getting loaded and provides integrity checking for the overall operating system.

During runtime, the IntegrityChecker function registered by the GI Elam/GI Jane may be asynchronously called by the virtual machine monitor for multiple reasons. First, write traces are fired on memory areas where traces are put. In this case, the IntegrityChecker typically identifies if the write access was legitimate by looking at the VRIP making that write access and raise an alert if it finds it to be suspicious. Second, the one-shot timer was requested by the IntegrityChecker during initialization/runtime phase. In this case, IntegrityChecker does reconciliation checks on critical kernel structures. Third, if the Integrity Checker detects a violation, it will notify the management plan about the violation.

Figure 7A:
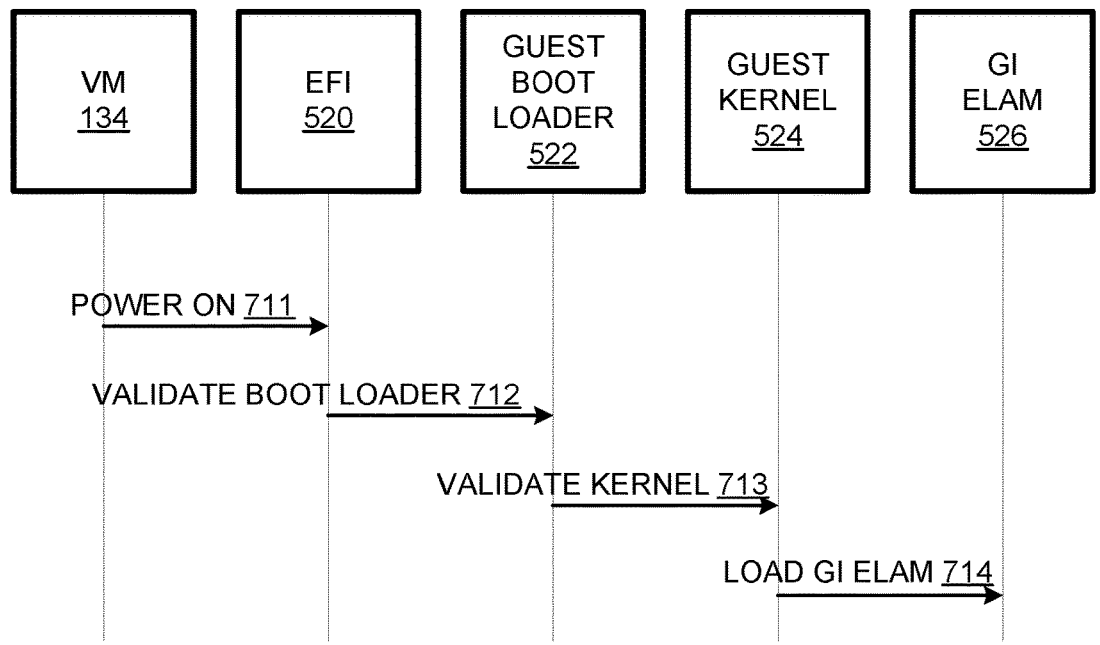
FIGS. 7A, 7B, and 7C constitute a timing diagram for the secure boot process of FIG. 6.
Figure 7C:
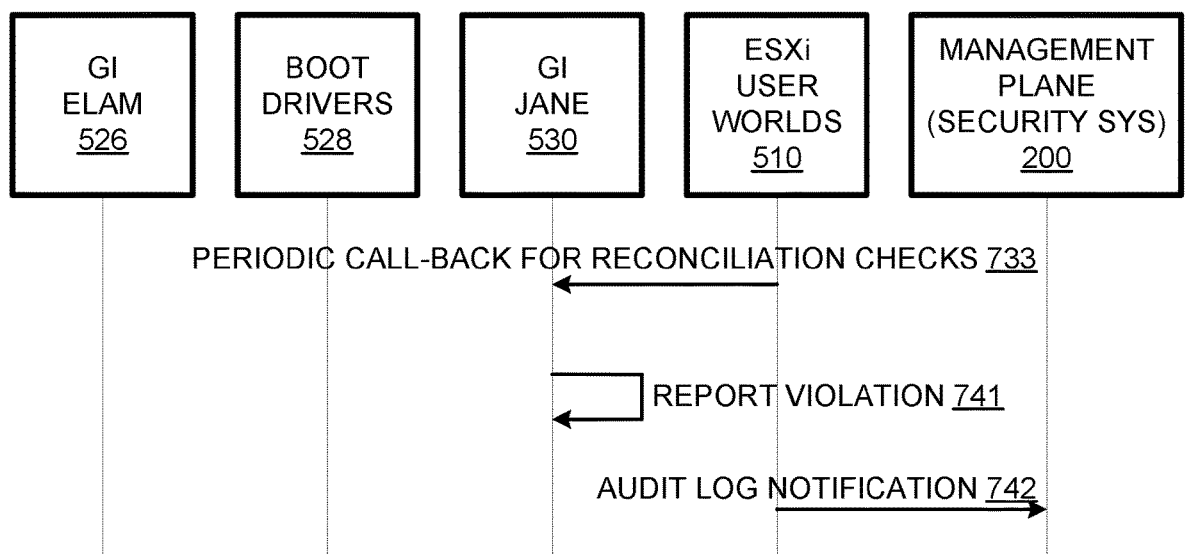
Figure 7B:
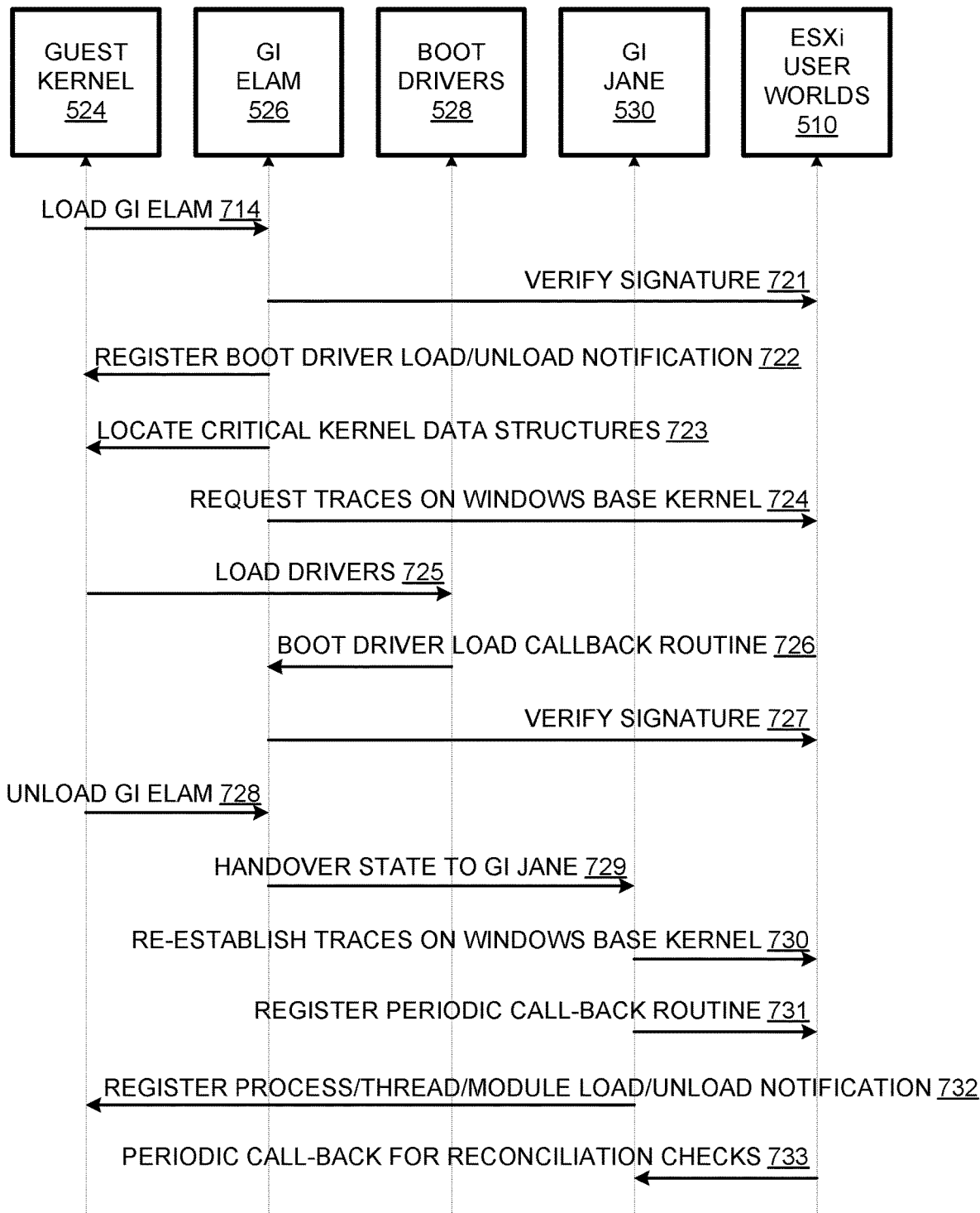

FIGS. 7A, 7B, and 7C constitute a timing diagram for a secure booting process. At 701, FIG. 7A, power is turned on. At 712, a boot loader is validated. At 713, a kernel is validated. At 714, FIGS. 7A and 7B, GI ELAM is loaded.

At 721, FIG. 7B, a signature of GI ELAM is verified. At 722, a boot driver load/unload notification is registered. At 723, critical kernel data structures are located. At 724, traces on a Windows (guest OS) base kernel are requested. At 725, drivers are loaded. At 726, a boot driver load callback routine is run. At 727, a signature for the callback routine is verified. At 728, GI ELAM is unloaded.

At 729, state is handed over to GI JANE. At 730, traces on the windows base kernel are re-established. At 731, GI JANE registers for a periodic callback routine. At 732, GI JANE registers for process/thread/module load/unload notifications. At 733, FIGS. 7B and 7C, there are periodic callbacks for reconciliation checks. At 741, FIG. 7C, any violations are reported. At 742, audio log notifications are made.

GI Elam/GI Jane protects against several attack vectors. They provide base kernel code protection by enabling write traces on code regions of NTOSKRNL.EXE and HAL.DLL. This ensures that if any malicious code attempts to tamper these code pages, an alert is generated.

GI Elam/GI Jane provide kernel driver code protection. GI Elam registers a callback using IoRegisterBootDriverCallback function. The callback gets called for all the boot drivers that are loaded into the system. Do the digital signature verification to ensure that the boot driver is not tampered on disk. Put write traces on the code regions of the driver. The GI Jane uses PsSetLoadImageNotifyRoutine to get a callback when other kernel drivers (non-boot drivers) are loaded and do the signature verification for those and also put write traces on the code regions of these drivers.

GI Elam/GI Jane detect interceptions in kernel drivers import/export table. They put write traces on the import and export table of kernel drivers to detect illegitimate modifications by rootkits to divert the execution flow.

GI Elam/GI Jane protect critical architecture defined processor data structures, e.g., IDT (Interrupt descriptor table), GDT (Global descriptor table). They put a write trace on IDT and GDT pages. If a write trace is fired, they do a VRIP check to ensure that the VRIP belongs to NTOSKRNL and/or other sign verified modules. Ideally, only NTOSKRNL/HAL makes these modifications; however there are cases where third party products may legitimately make modifications e.g. VMware workstation may make such legitimate changes. However, they should still originate from the sign verified VMM component.

GI Elam/GI Jane protect system call table. A guest OS such as Windows uses a system call descriptor table which has 4 entries. The entry 0 is used by NTOSKRNL to register its system calls. There is also a shadow descriptor table maintained by NTOSKRNL.EXE which contains descriptor entries for system calls registered by other components e.g. win32k.sys and http.sys. Both of these components go through the public interface exposed by NTOSKRNL to add their system calls. GI Elam and GI Jane put write traces on both these descriptor tables to ensure that they are modifiable only by a VRIP originating from NTOSKRNL code region. They also confirm that all the function pointers in the system call table are pointing to the code region sign verified modules. A stricter check could also be made where the function pointers are verified to be pointing to NTOSKRNL, win32k.sys or http.sys from the respective descriptor table.

GI Elam/GI Jane ensure security hooks are not removed by the rootkit. The security system registers various hooks with the operating system to get a callback on events of interest e.g. process start/stop, thread start/stop, kernel module load/unload. These hooks are stored as function pointers in the operating system data structure space. Write traces are placed on this data structure space and ensure that the modification can only be triggered by the drivers.

GI Elam/GI Jane protect Static OS Structures. An operating system maintains list heads to various linked lists in its data space. Pointers to these list heads are collected during the initialization phase and write traces are put on these to ensure that these list heads do not change for the current run of the operating system. If they change, they must originate from NTOSKRNL.

GI Elam/GI Jane detect Rogue Process/Thread Insertion. They register callback into the process/thread creation using PsSetCreateProcessNotifyRoutine(Ex) and PsSetCreateThreadNotifyRoutine(Ex) and periodically walk the process and thread list and prevent any process/thread that for which no callback has been received.

GI Elam/GI Jane detect rogue kernel driver insertion. They register callback into the kernel module load using PsSetLoadImageNotifyRoutine and periodically walk the kernel module list and ensure that there is no kernel module for which they have not received a callback.

GI Elam/GI Jane protect EPROCESS and ETHREAD kernel structures use ObRegisterCallbacks routine to get a callback when EPROCESS and ETHREAD objects are created. Use write traces and ensure that these objects are modifiable only by a VRIP originating from NTOSKRNL.

GI Elam/GI Jane protect critical registry values that may autorun/autoload EXEs/DLLs. They monitor critical registry locations that allow auto-running applications or auto-loading DLLs using CmRegisterCallback(Ex) routine. Some examples of registry locations that are monitored are the following:

HKLM\SOFTWARE\Microsoft\Windows\CurrentVersion\Run
HKLM\SOFTWARE\Wow6432Node\Microsoft\Windows\CurrentVersion\Run
HKCU\SOFTWARE\Microsoft\Windows\CurrentVersion\RunOnce
HKLM\Software\Microsoft\Windows\CurrentVersion\Group Policy\Scripts\Startup
HKLM\System\CurrentControlSet\Services\SERVICE-NAME\ImagePath Any executable/DLL that gets placed at this location is sign verified. FIGS. 7A-7C constitute a sequence diagram for GI Elam and GI Jane.

GI Elam and GI Jane rely on the following facilities from the hypervisor monitor. a) Traces: An ability to put a trace (read/write/execute) on any memory page and the hypervisor would asynchronously call a handler function in the guest driver when the trace is fired. b) Signature Verification: Para-virtualized signature verification for the guest drivers. The guest driver would initiate the verification by passing the meta information about itself. The VMM/VMX layer would communicate the same to a user world (mux or equivalent) running on host. The user world would read guest memory and do the signature verification. c) One shot timer: Guest driver would register a handler function that gets called after the specified amount of time. The handler function could request another one-shot timer as it sees fit. The handler function would be called asynchronously by the hypervisor outside the scope of guest scheduling.

The following external (to the guest and host) facilities are used. a) Signature verification: The guest driver would need to initiate the signature verification. The VMX layer would hand it over to the NSX user world (mux or equivalent) running on host. The user world would use more primitives from the VMX to read the guest memory and do the signature verification.

b) Reporting violations: When guest integrity checker detects a violation, it needs to communicate it back to the user world which can report it back into NSX manager. The same VMX channel can be used to communicate that.

c). The functionality of GI ELam and GI Jane drivers is described above. a) The primary mechanism used for detecting violations is traces which causes a hardware exit when they are fired and results in hypervisor calling a handler function in the guest driver. There is a cost associated with the hardware exit and the cost of the handler function. b) For write traces getting fired on the code regions, the overheads should be minimal since code pages are not usually modified unless there is a case of a self-modifying code or a rogue attack.

d) For protecting critical kernel data structures using write traces, there may be have much higher overheads. Basically the granularity of the trace is at the page level and hence even if only a part of the page is to be monitored, the trace will get fired whenever anything gets written to on that page at any offset. In such cases, whether the trace was fired for an address of interest and, if so, was it legitimate.

e) The guest integrity checker is built to figure out actual performance overheads. If a rogue in the guest changes the guest page table mappings for the GI Elam, GI Jane or other kernel drivers the monitor can ensure that the integrity checker function that runs in the guest still has a page table mapping intact before calling the integrity checker function. However, the protection is only up to first instruction and a rogue could remap after that.

In order to provide protection against this attack, tracking all guest page tables are tracked. This is analogous to implementing a software MMU within the guest integrity checker. An embodiment provides for implementing this inside the guest integrity checker preferably by sitting outside the guest operating system.

To implement software DEP (Data Execution Prevention), execute traces are placed on pages that are occupied by kernel stacks/heap. The requirement on locking the pages for putting traces can be removed. By tracking page tables, traces can be de-applied and re-applied as a page is swapped out/in.

Figure 8:
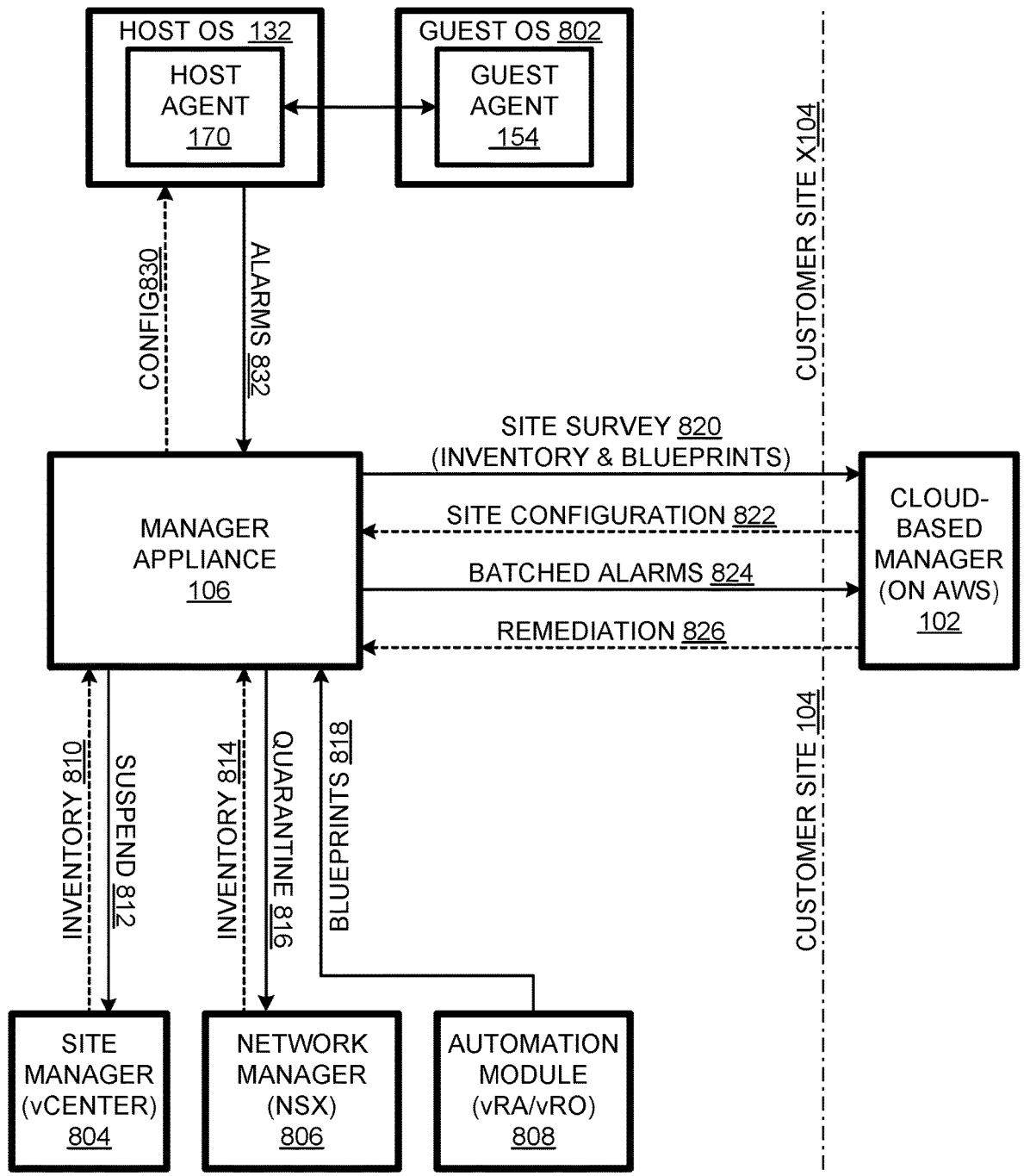
FIG. 8 is a schematic diagram of components of the computer management system of FIG. 1 indicating items that are either pushed (solid arrows) or pulled (dashed arrows) between components.

A logic diagram of computer management system 10 is presented in FIG. 8. Guest agent 154 is shown within guest OS 802. Manager appliance 106 is shown pulling inventory 810 from a site manager (e.g., VMware vCenter) 804 and pushing suspend commands 812 thereto. Manager appliance 106 is shown pulling inventory 814 from network virtualization and security solution NSX 806 and pushing quarantine object thereto. In addition, manager appliance pulls blueprints from automation module 808. Host OS 132 is shown puling configurations 830 from manager appliance 106 and sending alarms thereto.

Manager appliance 106 pushes site survey (inventory and blueprints) to cloud-based manager 102, and pushes batched alarms to CBM 102. Manager appliance pulls site configurations 822 and remediations 826 from CBM 102.

Figure 9:
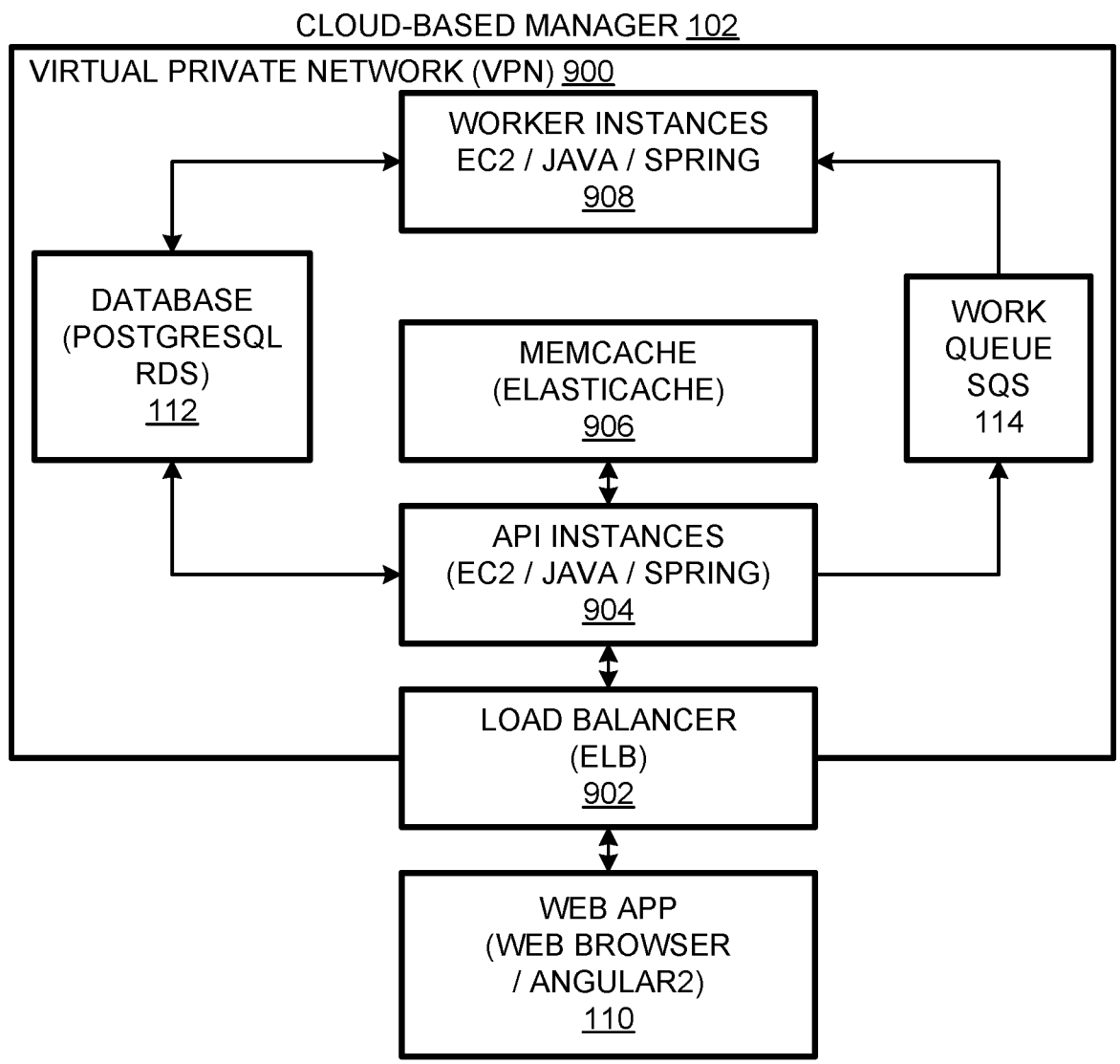
FIG. 9 is a schematic diagram of the cloud-based manager of the security system of FIG. 2.

As shown in FIG. 9, cloud-based manager 102 can include a virtual private network (VPN) with one or more load balancers 902, API instances (e.g., EC2, Java, Spring) 904, Memcache 906, e.g., Elasitcache, and worker instances 908 (e.g., EC2, Java, Spring).

Figure 10:
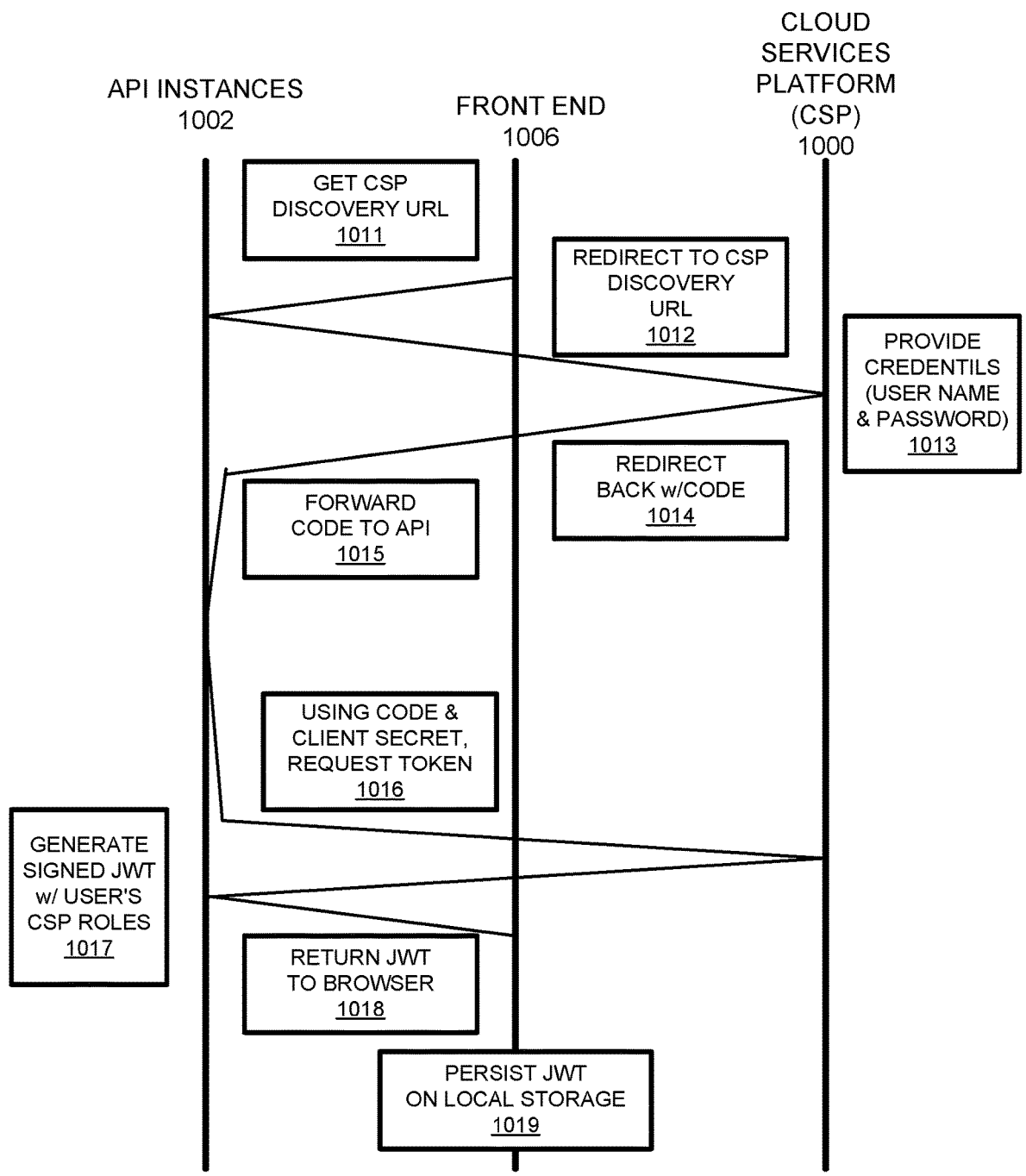
FIG. 10 is a sequence diagram for a cloud services platform 1000 and API instances 1002 via a front end 1004.

FIG. 10 is a sequence diagram for a cloud services platform 1000 and API instances 1002 via a front end 1004. Actions include get CSP discovery URL 1011, redirect to CSP discovery URL 1012, provide credentials 1013 (user name, password), redirect back code 1014, forward code to API 1015, using code and client secret request token 1016, generate signed JSON Web token (JWT) with users CSP roles 1017, return JWT to browser 1018, and resist JWT on local storage 1019.

Figure 11:
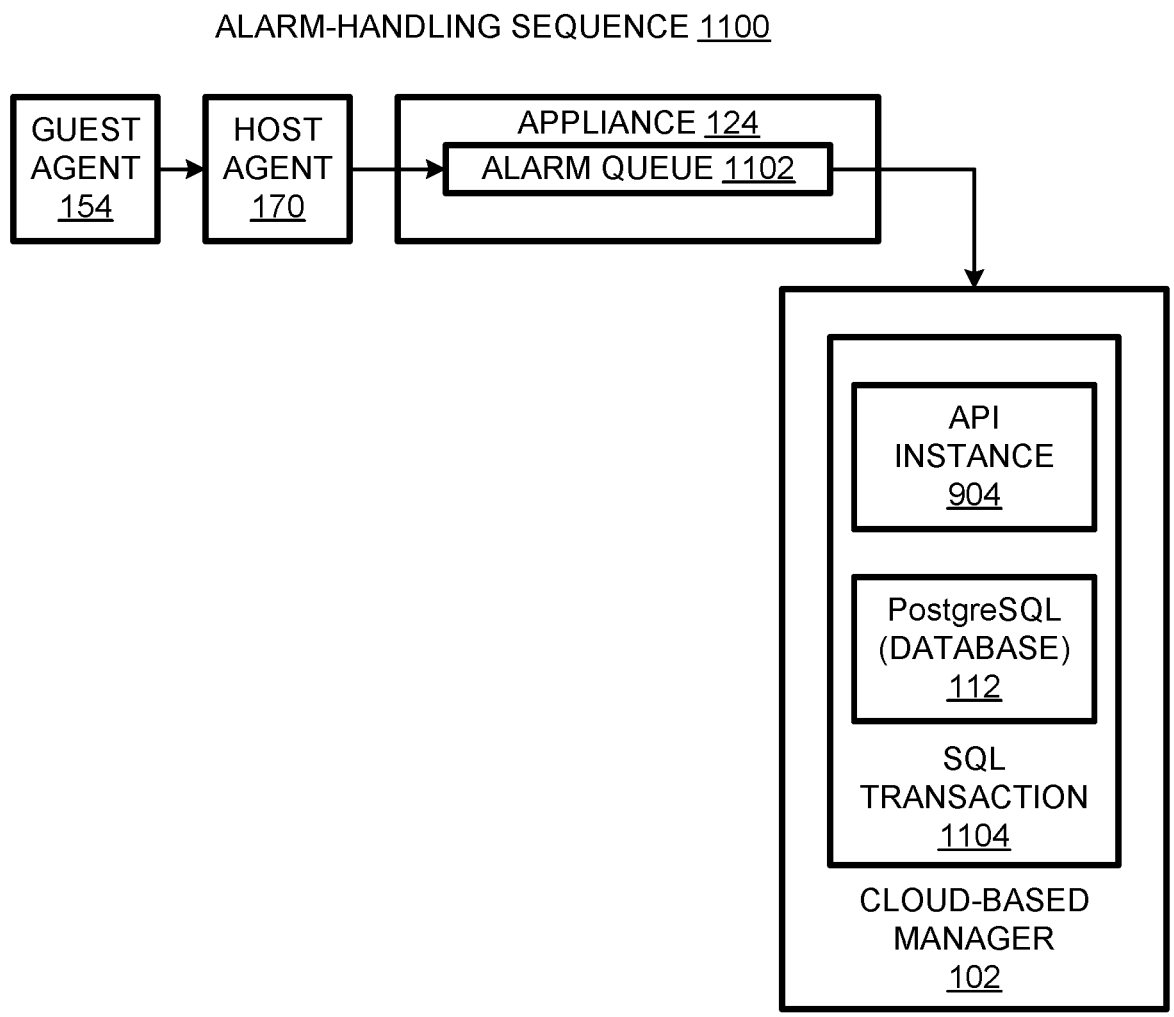
FIG. 11 is a schematic diagram of an alarm handling sequence of the security system of FIG. 2.

An alarm-handling sequence 1100, implemented in security system 200, is shown in FIG. 11. An alarm is generated by guest agent 154 and passed to host agent 170. Host agent 170 passes the alarm, e.g., in bundle of alarms, to an alarm queue 1102 of appliance 124. From there the alarm triggers an SQL transaction 1104 in cloud-based manager 102.

Design motivations for security system 200 include: 1) rapid initial delivery and continuous iteration of customer-facing features; 2) maintenance of the security and integrity of customer's existing infrastructure; and 3) support for on-premises and VMware Cloud on AWS deployments.

An inventory collection data flow process 1200, implemented in security system 200, is flow-charted in FIG. 12. At 1201, the appliance connects to site manager and sends initial inventory upon boot. At 1202, the appliance subscribes to vCenter inventory updates. At 1203, the appliance sends any updates to manager once per minute.

A guest configuration data process is flow charted in FIG. 13. At 1301, the appliance polls guest configuration data from the manager every minute: one request per site manager; and provides HTTP caching to reduce load and traffic. At 1302, configuration data is cached in-memory at appliance and indexed by guest. At 1303, the host module (agent): polls guest configuration data from appliance single batched request for all virtual machines on host; and performs HTTP caching to reduce load and traffic.

An alarm data flow process 1400 is flow charted in FIG. 14. At 1401, a host module sends alarms synchronously to the appliance. If the appliance is unavailable, the alarms are queued on the host module. At 1402, the appliance batches all alarms over a time window. At 1403, the appliance sends batched alarms to cloud-based manager; the appliance queues alarms when the manager is unavailable. At 1404, the manager deduplicates alarms. A purpose of process 1400 is to limit traffic in storm events.

Figure 15:
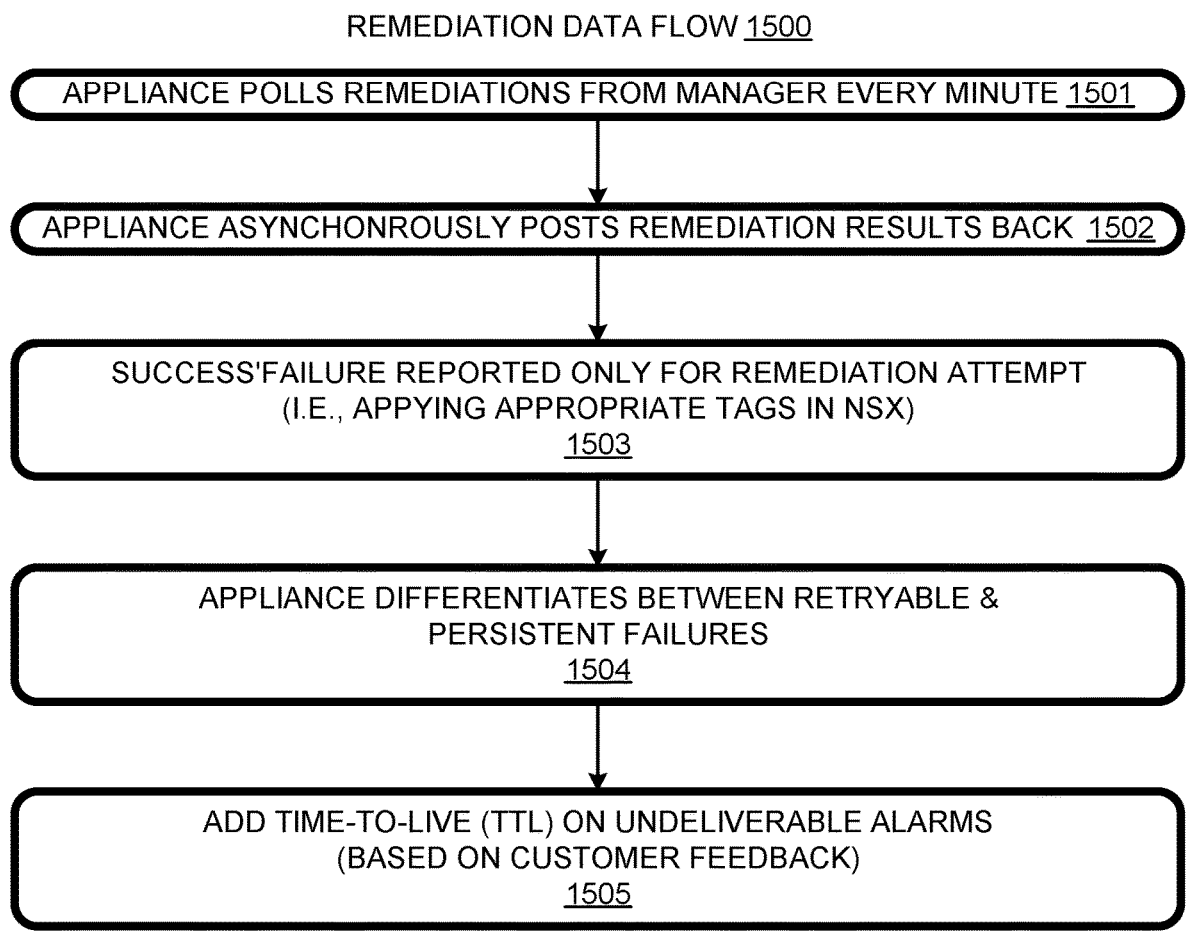
FIG. 15 is a flow chart of a remediation data flow.

A remediation data flow process 1500 is flow charted in FIG. 15. At 1501, the appliance polls remediations from the cloud-based manager every minute. At 1502, the appliance asynchronously posts remediation results back. At 1503, remediation success or failure reported only for remediation attempts (i.e., applying appropriate tags in NSX. At 1504, the appliance differentiates between retry-able and persistent failures. At 1505, TTL is added to undeliverable alarms (based on customer feedback).

Design principles for the cloud-based manager include scalability. To this end, the CBM is stateless everywhere except for the database and work queue. Decoupled services are deployable independently (e.g., user interface (UT), backend). The CBM uses a smart API implementation, e.g., exponential backoff on failures. In addition, the CBM limits use of non-portable (e.g., proprietary) AWS technology. Also, the CBM employs RESTful HTTP polling of APIs over the secure socket layer (SSL) protocol.

Regarding frameworks and platforms, the CBM uses Amazon Web Services (AWS) for hosting. Elastic Beanstalk (AWS PaaS) is used for deployment and orchestration. CBM uses a single multi-tenant Postgres database. EC2 instances run Amazon Linux (CentOS-based). CBM employs a Java8 Spring backend. Also, Angular2 and Clarity user interface with JSON Web Tokens (JWT) authentication Design principles for the appliance include scalability up to the largest vCenter deployment. The appliance is stateless except for configuration data. There are zero out-of-process dependencies. The appliance is recovery-oriented and safe to restart. The appliance acts as a client to the CBM, and acts as a server to the host agents.

Design choices for the appliance include one appliance per site manager (vCenter). High availability is supported. Open virtualization format virtual machines can be deployed using vSphere. The appliance requires outbound Internet connection to manager. The appliance uses Java 8 Spring Boot application running on VMware Photon Linux. Transport Layer Security (TLS) with mutual authentication to host module.

Figure 16:
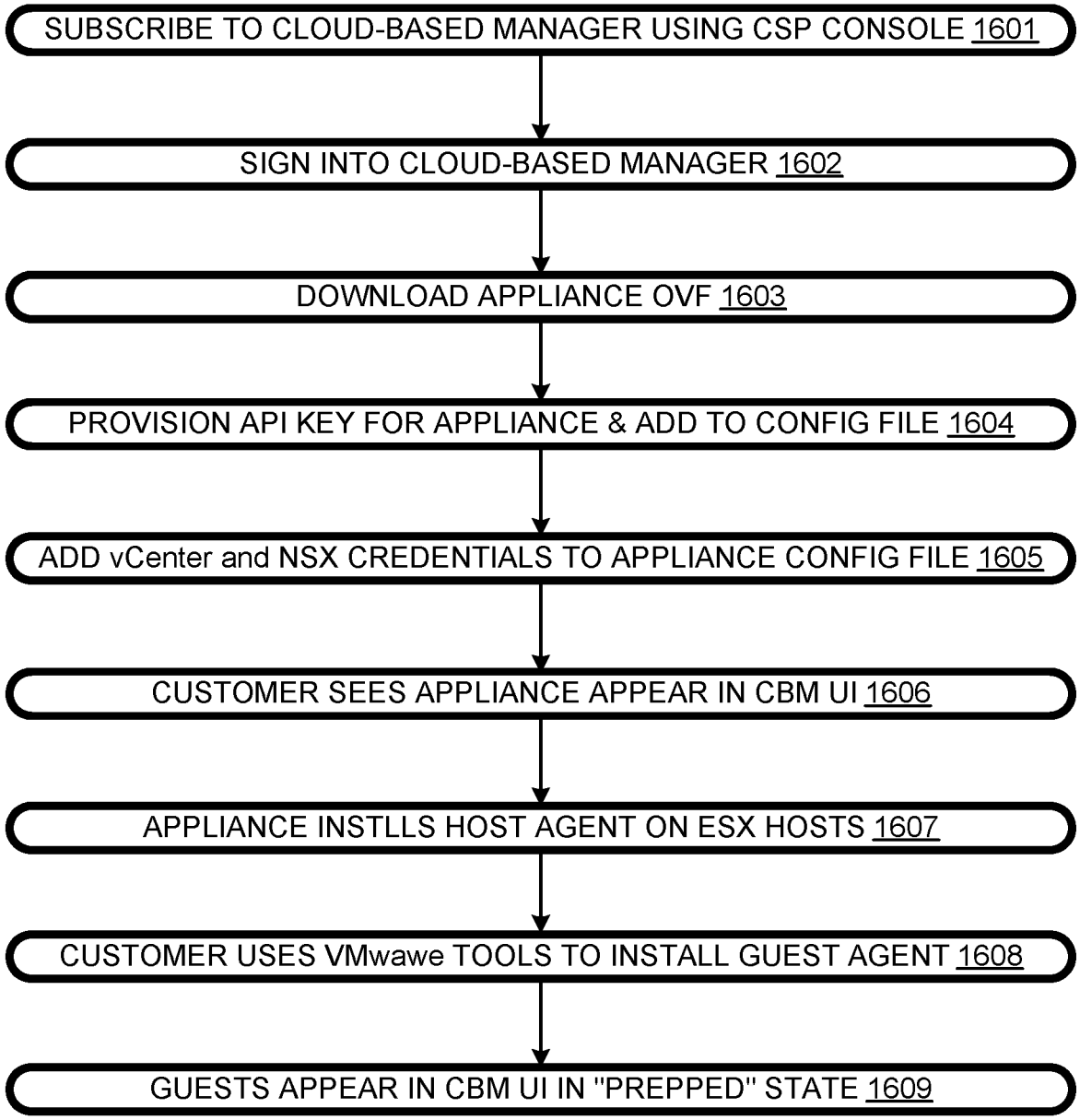
FIG. 16 is a flow chart of an installation customer workflow.

An installation customer workflow 1600 is charted in FIG. 16. At 1601, At 1601, a customer subscribes to cloud-based manager using cloud services provider (CSP) console. At 1602, customer signs into CBM. At 1603, the customer downloads the appliance OVF. At 1604, the customer provisions an API key for the appliance and adds to a configuration file for the appliance. At 1605, the customer adds vCenter and NSX (if applicable) credentials to appliance configuration file. At 1606, the customer sees the appliance appear in the CMB use interface. At 1608, the customer uses VMware Tools to install guest agents. At 1609, guests appear in the CBM user interface in "prepped" state.

The CMB performs monitoring on all infrastructure provided by AWS CloudWatch and monitoring of application instances using AWS X-Ray. Operators are alerted on: reduced uptime, degraded performance, increased error rate, increased work queue depth, and loss of a significant number of EC2 instances. The manager defines on-call rotation and policy to answer alerts. A customer-facing health dashboard shows status of all appliances, all connected services (NSC, vCenter), all host agents, and all guest agents. In addition, the dashboard allows for self-service troubleshooting. Diagnostic tools are provided to the customer to capture logs, operational state, and any runtime process information to be sent to customer service for the security system.

Using CSP as a source of identity and authentication CSP organizations are security system tenants. CSP users are security systems users. CSP roles are security system roles. APIs are fully tenant-aware. Cloud API URLs are parameterized by tenant ID. All APIs require an authorization header. Ownership of all rows enforced with database constraints. CBM ORM also enforces tenancy of reads and writes. Spring Security provides automatic auditing of data changes.

All communication between components is security at the app layer. Encryption is ensured as every connection in the system uses TLS. Every component has a unique identifier (API key or thumbprint). Every client and server authenticates its peer's identity. A customer-configurable CA cert chain validation is on by default. The front-end app is resilient against clickjacking, e.g., cross-site request forgery (CSRF), cross-site scripting (XSS), and man-in-the middle (MitM) attacks.

The CBM monitors if the appliance fails to poll for its configuration. The appliance queues and retries alarms when the CBM in unreachable. The appliance polls the CBM for remediations and acknowledges application. The appliance monitors if it cannot reach vCenter/NSX and notifies the CBM. The appliance queues and retries remediations when vCenter/NSX is unreachable. No proactive monitoring of vRA plugin by appliance. Failures are recorded at blueprint provision. Blueprint provisioning fails when the plugin cannot communicate with the appliance.

The CBM uses AWS services in maximum availability mode including EC2 auto-scaling, Route 53, ELB, SOS, RDS, and ElastiCache, all in multi-AZ configuration. DNS is primary failover mechanism. Failed instances are taken out of the load balancer by health checks. Instances with hardware failure are automatically replaced be EC2.

The appliance interacts with vCenter for VM inventory and remediations, with NSX for remediations via tagging, and vRA/vRO for receiving application context data during VM provisioning. The CBM integrates with CSP for user and operator authentication; also integrates with CSP to use CounterTack for threat score interpretation. Also, the guest agents interface for CounterTack for threat scores.

An embodiment of the security system relies on Amazon Web Services (AWS), so the scalability of AWS is pertinent to the scalability of the security system. The AWS ELB load balancer can scale to over 10,000 SSL requests/sec. AWS RDS only scales vertically (up to 32 CPUs/244 GB RAM). ElastiCache scales horizontally with key-based partitioning. SQS message queue (15,000 messages sent/sec., 4 k message received/sec.

Figure 17:
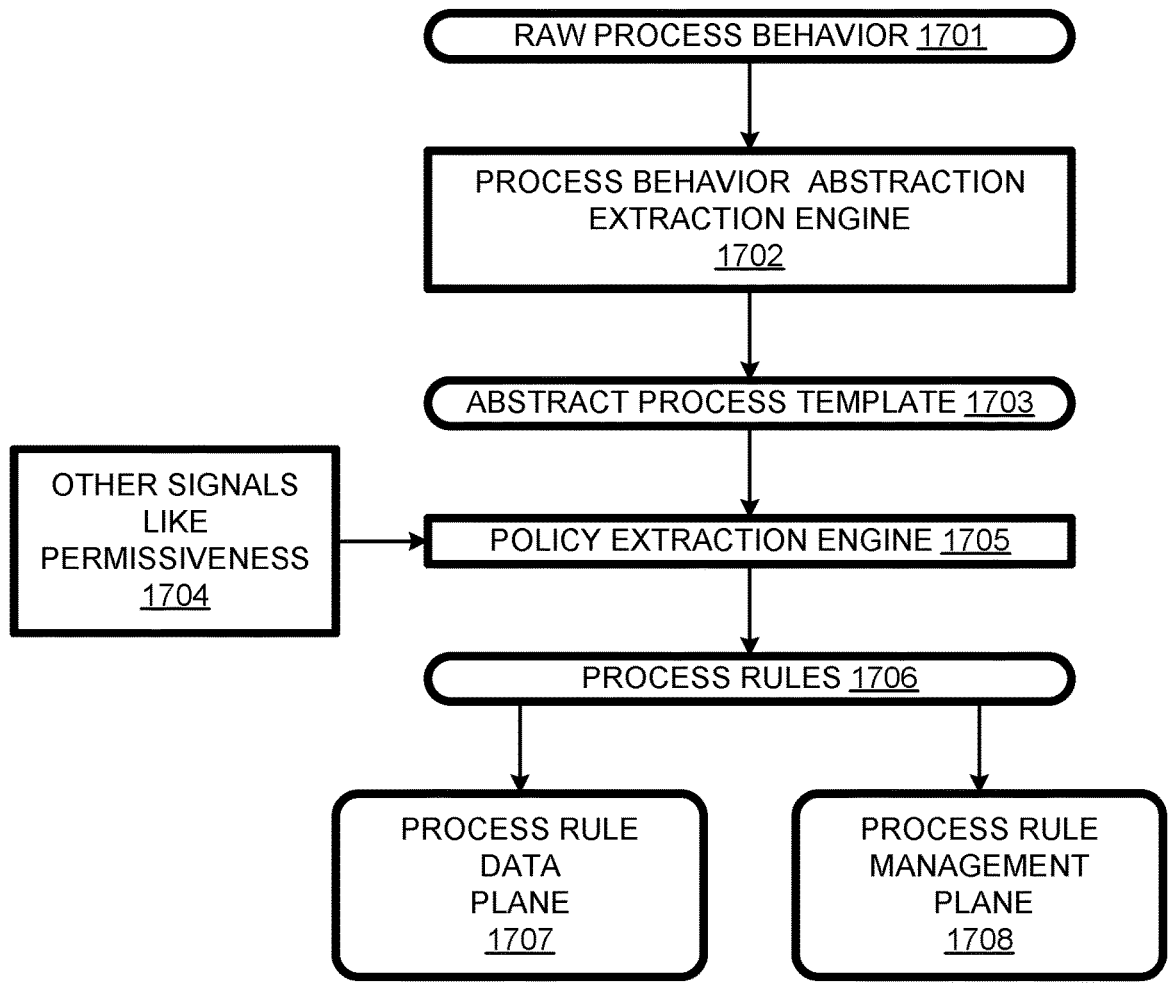
FIG. 17 is a flow chart of a process behavior extraction and behavior rule generation.

A process 1700 for process behavior extraction and behavior rule generation is represented in FIG. 17. At 1701, raw process behavior is generated. The raw process behavior is input to the process behavior abstraction extraction engine 1702, resulting in an abstract process template 1703. The abstract process template 1703, as well as other signals such as permissiveness 1704, are input to a policy extraction engine 1705. This yields process rules 1706, which are input to a process rule data plane at 1707 and a process management plane at 1708.

Figure 18:
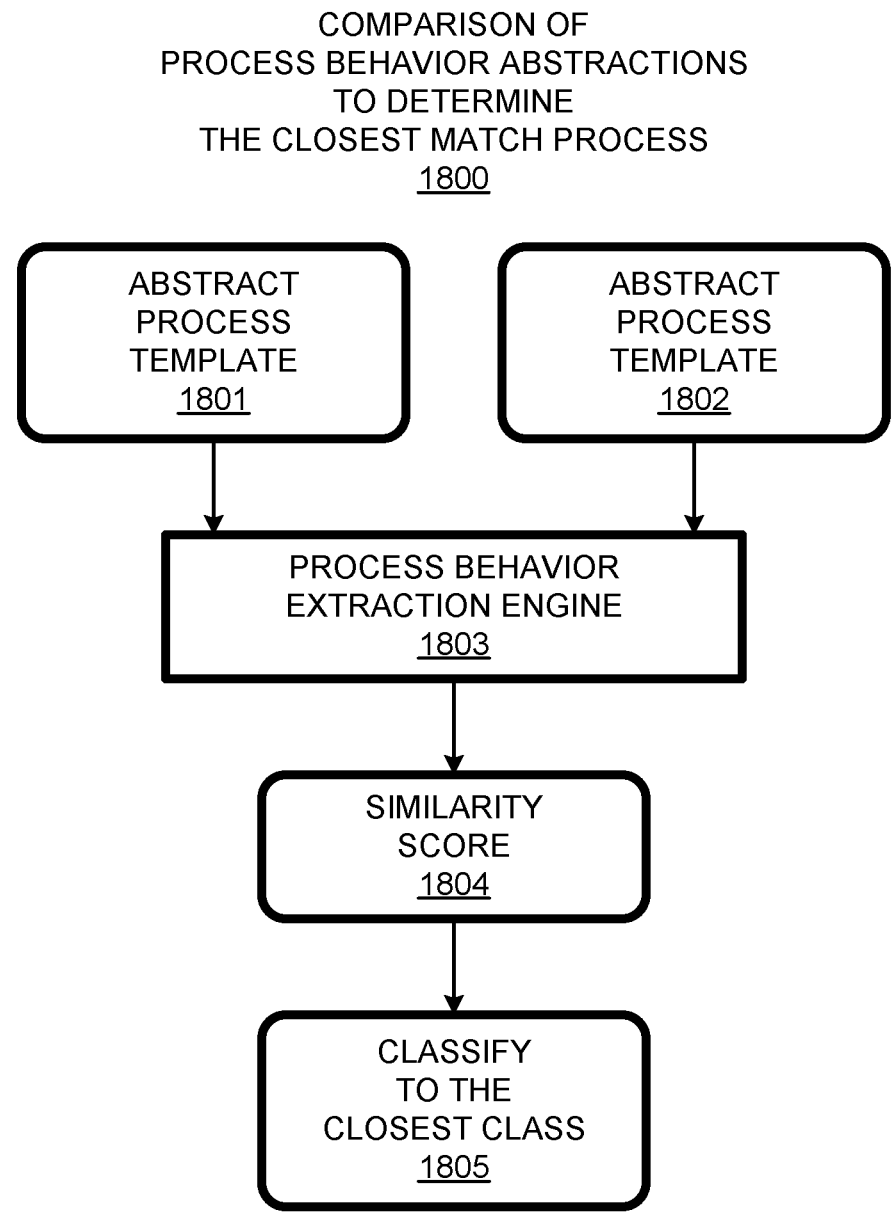
FIG. 18 is a flow chart of a process for comparing process behavior abstractions to determine the closest match.

A process 1800 for comparison of process behavior abstraction to determine the closest match is flow charted in FIG. 18. Abstract process rule templates 1801 and 1802 are input to a process behavior extraction engine 1803, yielding a similarity score 1804. Classification to the closest class occurs at 1805.

Figure 19:
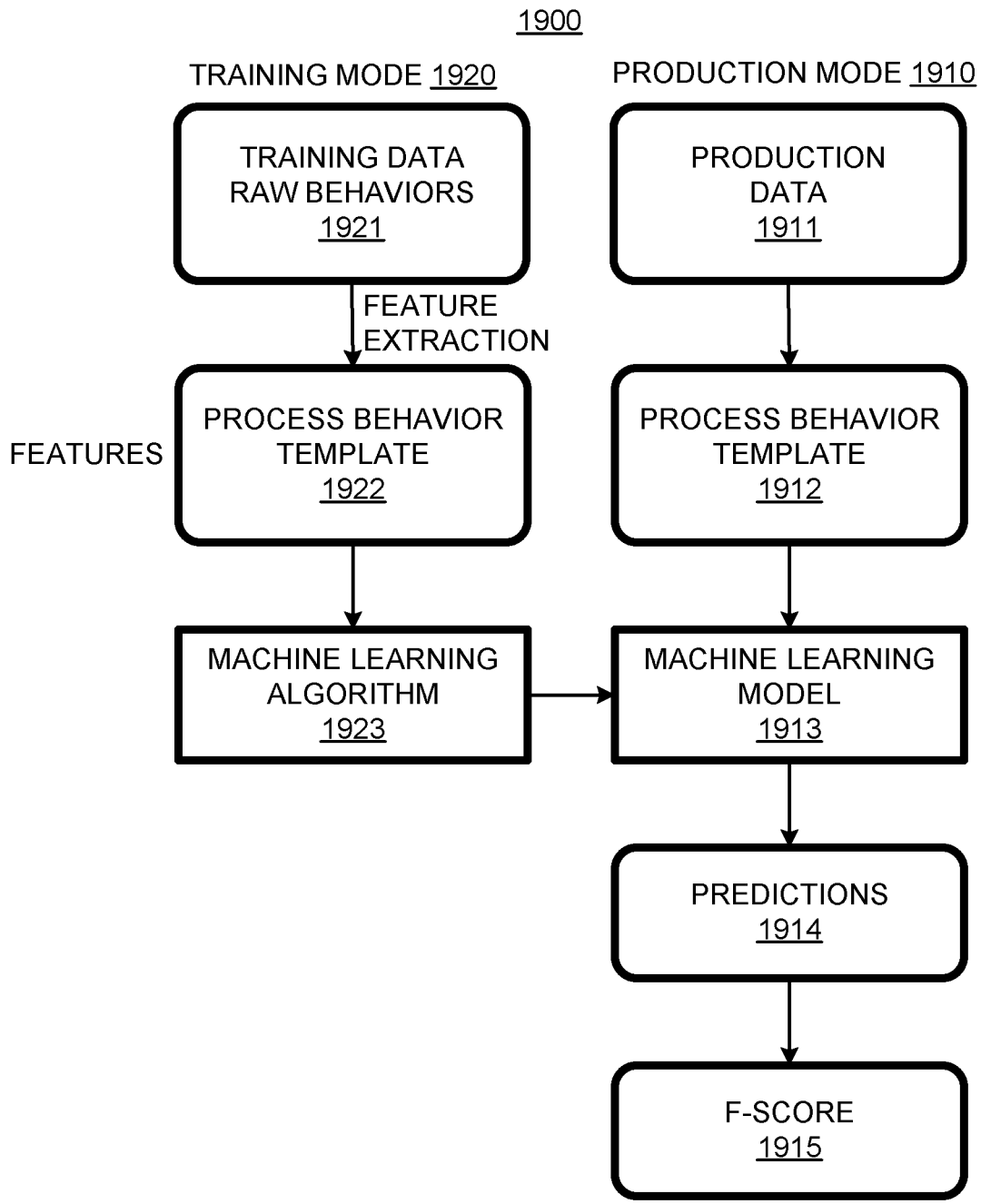
FIG. 19 is a flow chart of a process for applying machine learning to test the effectiveness of process abstraction from a process comparison perspective.

A process 1900 for applying machine learning to test the effectiveness of process abstraction from a process labeling perspective is flow-charted in FIG. 19. Process 900 includes a production mode 1910 and a training mode 1920. In production mode 1910, production data is generated at 1911. A process behavior template is applied at 1912, and the result is input to a machine learning model at 1913. The machine-learning model outputs predictions at 1914. At 1915, the prediction can be evaluated as to abstraction effectiveness in the form of an F-score.

Machine-learning model 1913 is developed during training mode 1920. At 1921, training data raw behaviors are generated. At 1922, feature engineering is applied and the results are input to a process behavior template. The results are input to a machine-learning algorithm 1923, which yields and updates machine-learning model 1913.

Figure 20:
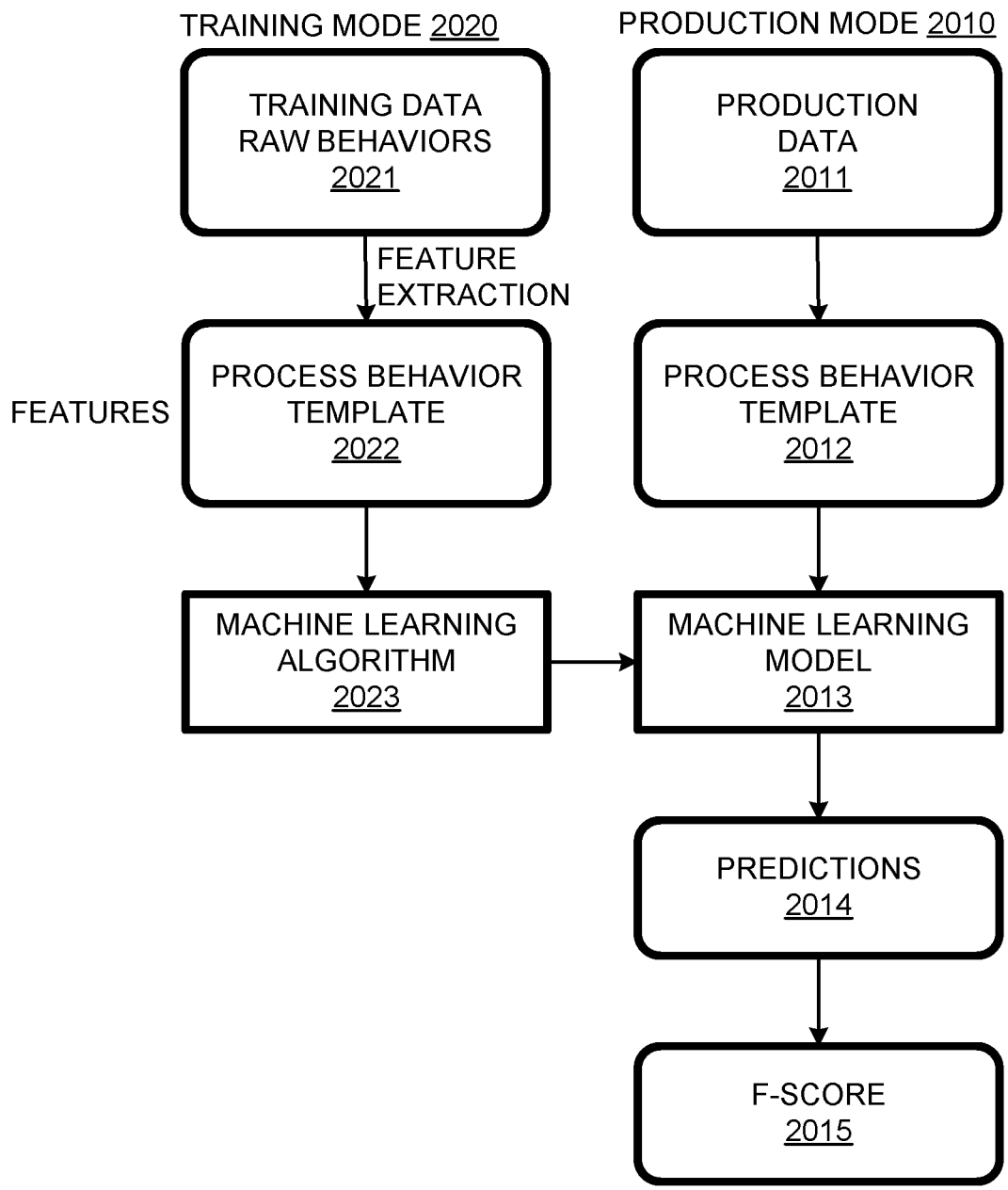
FIG. 20 is a flow chart for applying machine learning to test the effectiveness of process abstraction from a false positive reduction goal perspective.

The abstraction effectiveness measure can also be evaluated from a false-positive reduction-goal perspective in the process 2000, flow charted in FIG. 20. Process 2000 has a production mode 2010 and a training mode 2020. In production mode 2010, at 2011, production data is generated. At 2012, a process behavior template is applied to the production data. The results are input to a machine learning model 2013. This generates predictions 2014. At 2015, the predictions are evaluated against actual outcomes to provide, at 2015, an abstraction effective measure from a false positive perspective in terms of an F-score.

In training mode 2020, training data raw behaviors are input. The training data labels are high false alarms and low false alarms. The training data is input to the process behavior template at 2022. The results are input to a machine-learning algorithm at 2023, which yields machine-learning model 2013.

Figure 21:
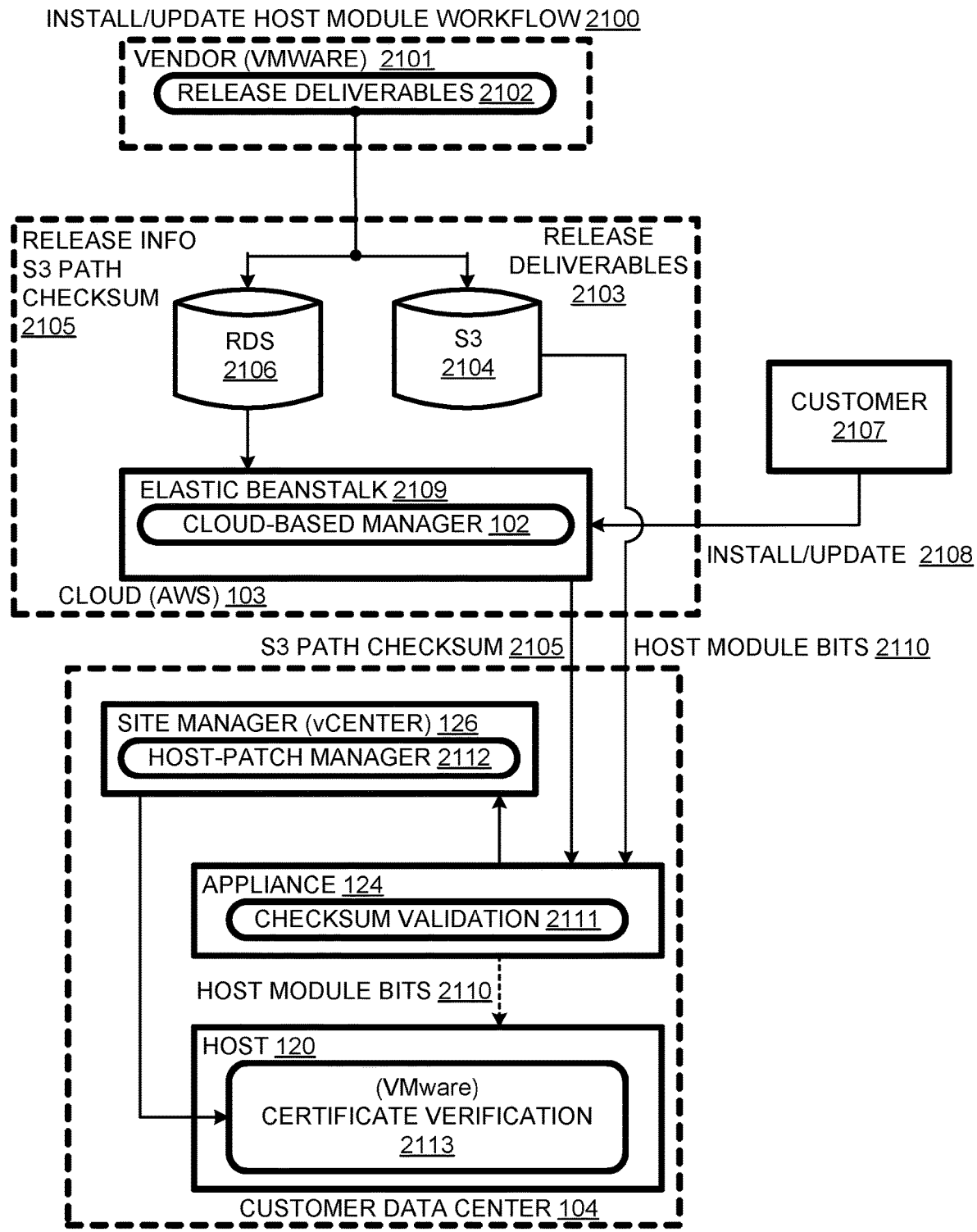
FIG. 21 is a schematic view of the managed computer system of FIG. 1 from the perspective of installing components of the security system of FIG. 2.

An install/update host module workflow 2100 is charted in FIG. 21. A security system vendor, e.g., VMware, releases deliverables at 2102. The release deliverables 2103 are stored in Amazon simple storage S3 2104, while release information S3 path checksum 2105 is stored in Amazon relational database service RDS 2106. When a customer 2107 installs/updates the host module at 2108 via the cloud-based manager 102, which is installed in Elastic Beanstalk 2109. The S3 path checksum 2105 and the host module bits 2110 are transmitted to the appliance 124 in customer data center 104. At appliance 124, the host module bits 2110 undergo checksum validation at 2111. Assuming checksum validation passes, the host module bits are passed to a host patch manager 2112 of the local data center manager 126 and a (VMware) certificate verification module 213 on host computer system 120.

Figure 22:
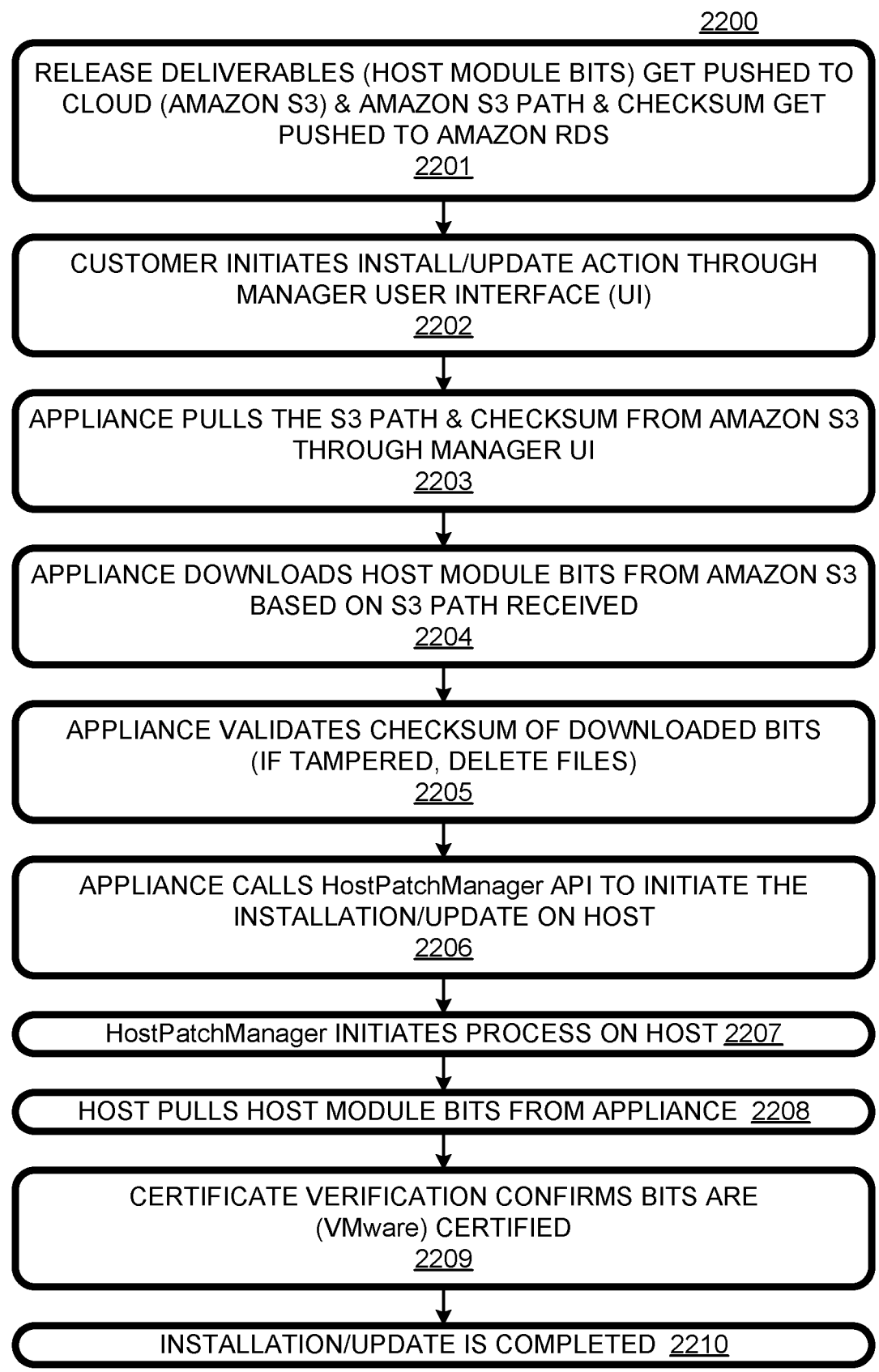
FIG. 22 is a flow chart of a process for installing the security-system components referred to in FIG. 21.

This installation/update process is flow-charted in FIG. 22. At 2201, release deliverables (host module bits) get pushed to cloud (Amazon S3) & Amazon S3 path and checksum get pushed to Amazon RDS. At 2202, customer initiates install/update action through manager user interface (UT). At 2202, the appliance pulls the S3 path and checksum from Amazon S3 through the manager user interface.

At 2203, the appliance pulls the S3 path & checksum from Amazon S3 through the manager user interface. At 2204, the appliance downloads host module bits from Amazon S3 based on S3 path received. At 2205, the appliance validates the checksum of downloaded bits (if tampered, the files are deleted). At 2206, the appliance calls HostPatchManager API to initiate the installation/update on a host. At 2207, HostPatchManager initiates process on host. At 2208, host pulls host module bits from appliance. At 2209, certificate verification confirms bits are (VMware) certified. At 2210, installation/update is completed.

Figure 23:
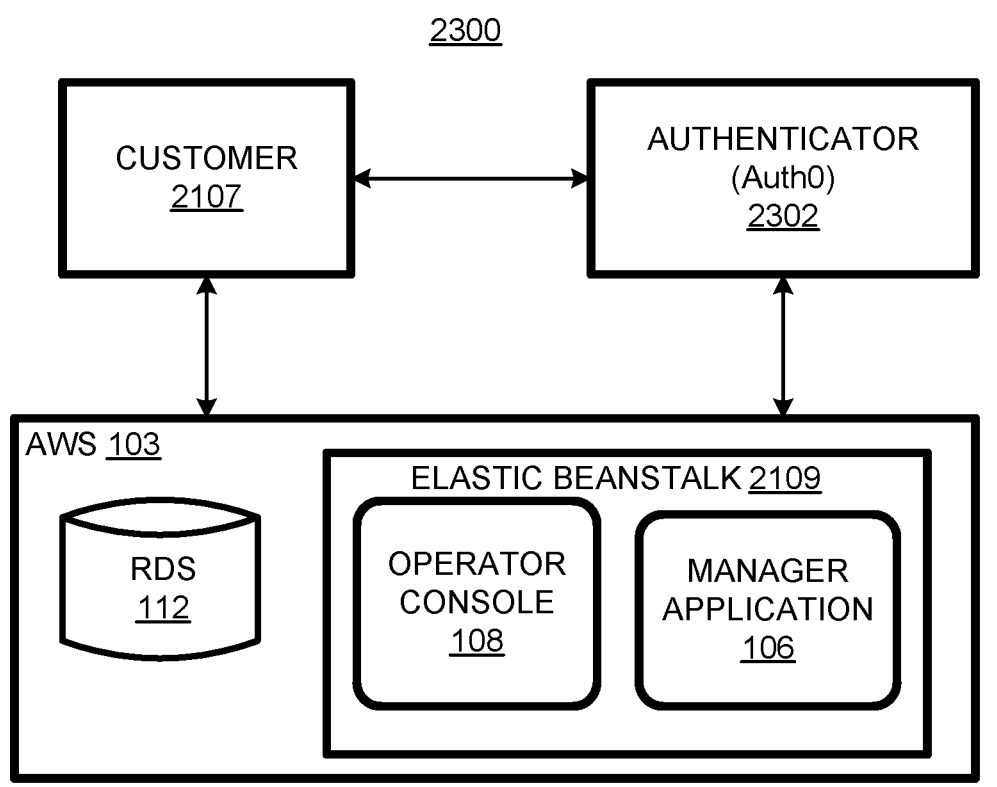
FIG. 23 is a schematic diagram of a security system authentication workflow.

In FIG. 23, customer 2107 is shown interacting with an authenticator (Auth0) 2302. Cloud services (AWS) 102 is shown including RDS 112, and Elastic Beanstalk 2109, which, in turn, includes operator console 108 and manager application 106.

Figure 24A:
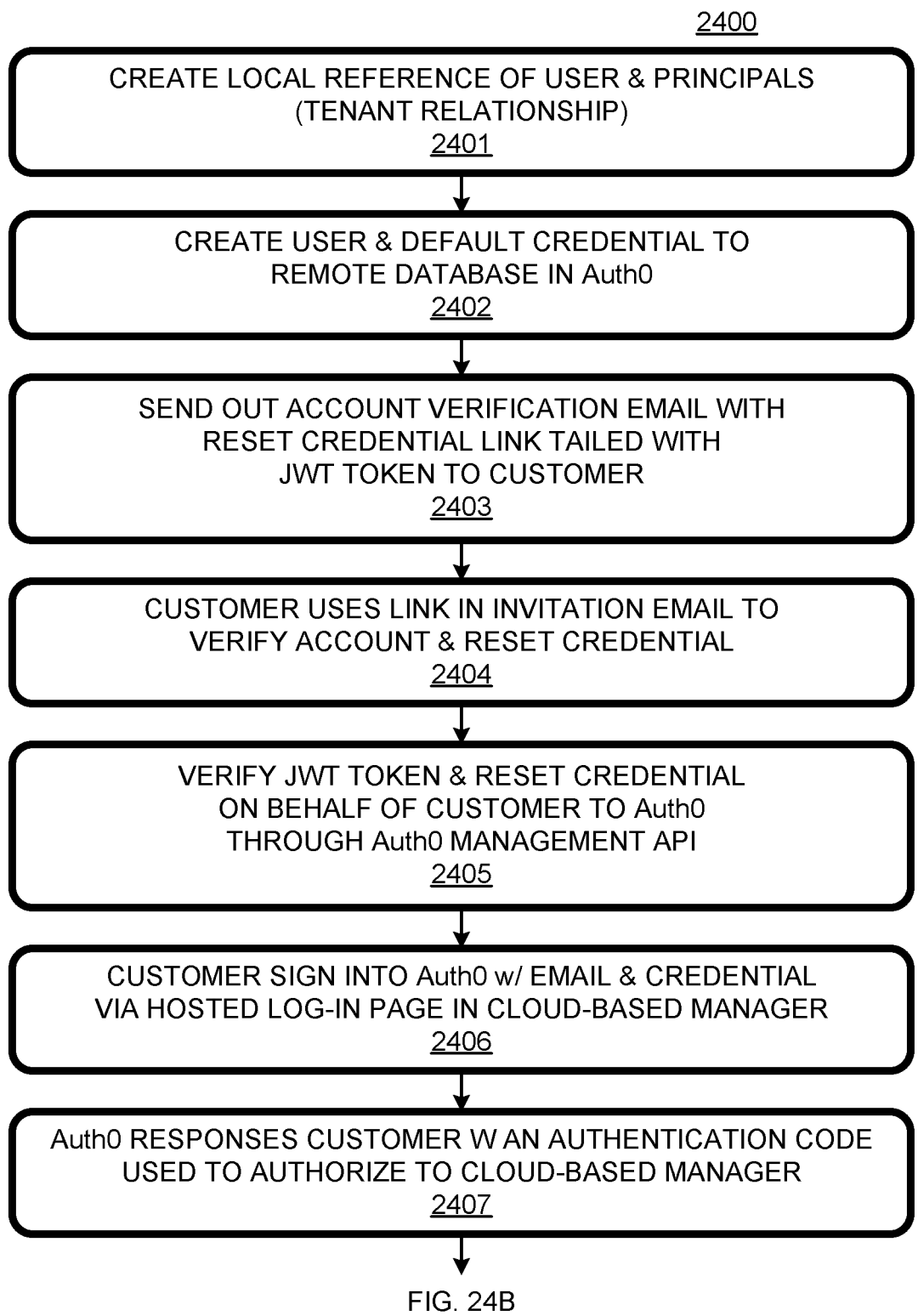
FIGS. 24A and 24B constitute a flow chart for the authentication workflow of FIG. 23.
Figure 24B:
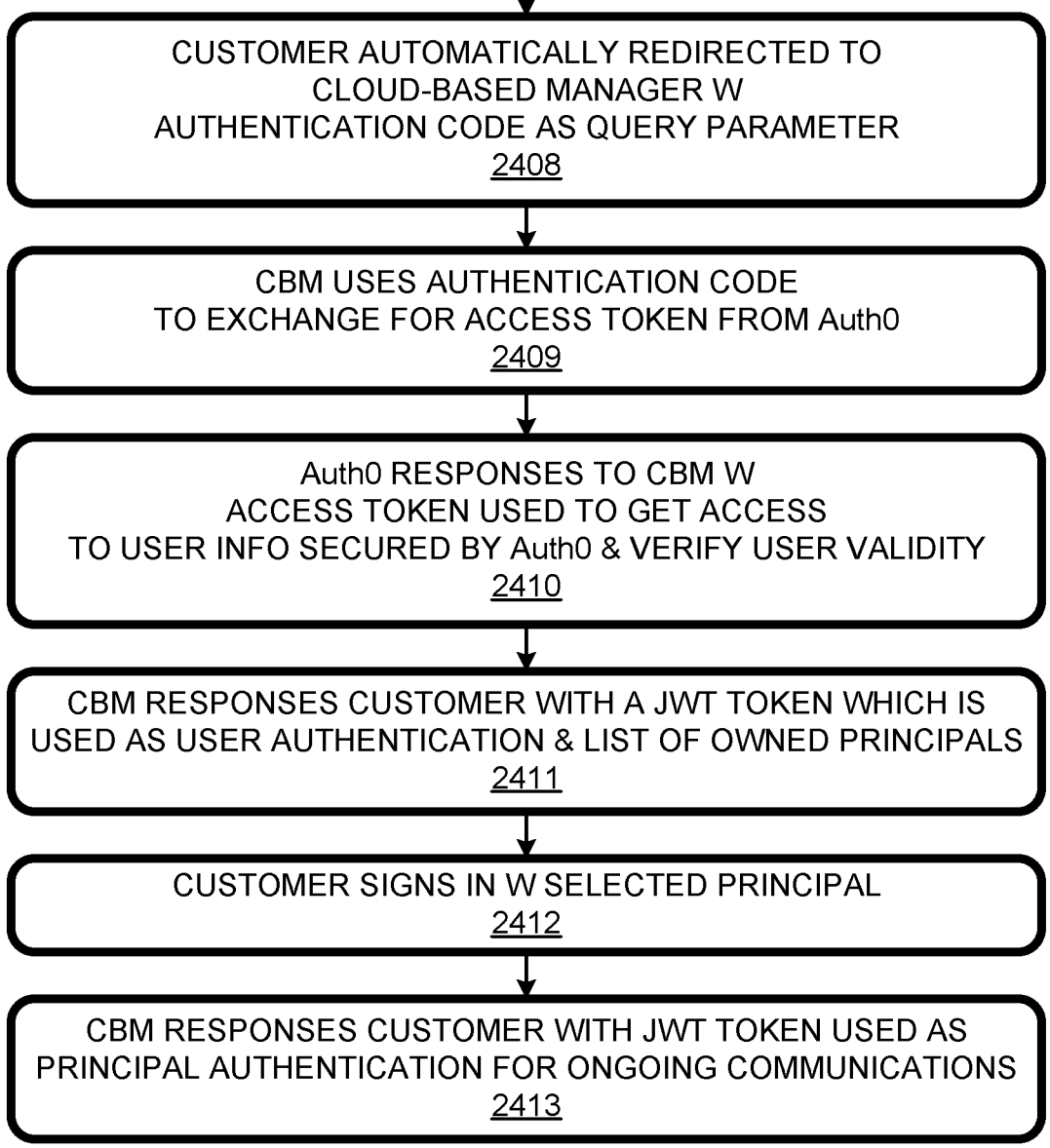

An authentication process 2400 is flow charted in FIG. 24. At 2401, a local reference is created of user and principals (tenant relationship). At 2402, a user and default credential is created to remote database in the authentication service Auth0. At 2403, an account verification email is sent out to customer with a reset credential link tailed with a JWT token to customer. At 2404, the customer uses link in invitation email to verify account and reset credential. At 2405, the JWT token and reset credential are verified on behalf of the customer to Auth0 through an Auth0 management API.

At 2406, the customer signs into Autho0 with email and credential via hosted log-in page in cloud-based manager. At 2407, Auth0 responds to customer with an authentication code used to authorize to the cloud-based manager. At 2408, the customer is automatically redirected to cloud-based manager with authentication code as query parameters. At 2409, the cloud-based manager uses the authentication code to exchange for access token from Auth0. At 2410, Auth0 responds to CBM with access token used to get access to user information secured by Auth0 and to verify user validity.

The CDBM responds to customer with a JET token which is used as user authentication and with a list of owned principals. At 2412, the customer signs in with selected principal. At 2413, the CBM responds to the customer with JWT token used for principal authentication for ongoing communications.

Appendix: AWS Information AWS Infrastructure Services

EC2: Ephemeral compute instances that run security-system code.

Elastic Load Balancer: Load balancing and instance health checks. The security system uses ELB as a Layer 7 (HTTPS) load balancer.

Relational Database Service: Managed EC2 instances running PostgreSQL. RDS manages software updates, HA failover, and database backups.

Virtual Private Cloud (VPC): Software-defined networking. VPC helps isolate the EC2 instances, load balancers, and database instances into different subnets and define routing and security policies between them, increasing manageability and providing defense-in-depth against attacks on the security-system infrastructure Simple Queue Service (SQS): Message queue used internally within the Manager as a work queue. Long-running tasks that are to be executed asynchronously are added to the queue and consumed by a worker process.

SQS is an exception to the "no exotic infrastructure" rule. Amazon does not provide managed AMQP infrastructure, so SQS is used for simplicity. An alternative embodiment replaces SQS with RabbitMQ for an on-premises deployment. RabbitMQ is an open source message broker software (sometimes called message-oriented middleware) that originally implemented the Advanced Message Queuing Protocol (AMQP) and has since been extended with a plug-in architecture to support other protocols.

ElastiCache: Managed Memcache instance, used by EC2 hosts to offload and share nondurable cached data.

Route 53: A managed DNS service operated by AWS. Route 53 is integrated with RDS, Elastic Beanstalk, and ELB, and is used to provide DNS-assisted failover for those services. An additional DNS provider may be used to host the customer-facing domains, depending on the nature of the integration with VMware IT.

Other Services/Future Work: CloudFront (CDN), WAF, and Shield (DDoS protection) include the following.

EC2 Auto Scaling: Maintains a fleet of EC2 instances and attaches them to the load balancer. Auto-Scaling will replace failed hosts to ensure a minimum fleet size, and can automatically provision additional hosts in response to infrastructure or application metrics.

Elastic Beanstalk: As explained above, orchestrates all of these services and provides a basic code deployment workflow. Elastic Beanstalk also provides an environmental configuration mechanism that allows the security system to bind stage-specific parameters and secrets at run time.

CloudWatch and X-Ray: A set of services for generating and aggregating performance metrics, application uptime metrics, logging streams (application and infrastructure), and error rates.

Certificate Manager: Securely stores private keys and SSL certificates used by the load balancer.

Identity and Access Management: Manages fine-grained access control to AWS resources based on user and service roles.

Herein, all art labelled "prior art", if any, is admitted prior art; all art not labelled "prior art", if any, is not admitted prior art. The illustrated embodiments, variations thereupon, and modifications thereto are provided for by the present invention, the scope of which is defined by the following claims.

What is claimed is:

1. A computer security process comprising:
generating, by guest agent installed in virtual machines, alarms, said security process performed using a service-oriented architecture and using define versioned hyper text transfer protocol (HTTP) application program interfaces (APIs), said security process further providing explicit distinction between stateful and stateless components, and between stateful and stateless infrastructure within said stateful and stateless components;
transferring the alarms to host agents installed in hypervisors on which the virtual machines run;
consolidating, by the host agents, across alarms received from different virtual machines running on the same hypervisor;
pushing consolidated alarms from host agents to a manager appliance residing at the same computer site as the hypervisors;
batching, by the manager appliance, consolidated alarms received from different hypervisors, the batching occurring over a time window;
pushing, by the manager appliance to a cloud-based manager separate from the computer site, the batched alarms; and
notifying, by the cloud-based manager, an administrator of the alarms.

2. The computer process of claim 1 further comprising, prior to the notifying, deduplicating, by the cloud-based manager, the batched alarms.

3. The computer process of claim 1 further comprising:
pulling, by the manager appliance, remediations from the cloud-based manager; and
pushing, by the manager appliance, remediations to a site manager at the computer site and separate from the manager appliance.

4. The computer system of claim 3 wherein the remediations include suspensions of virtual machines.

5. The computer system of claim 3 further comprising pushing remediations including quarantines to a network manager at the computer site and separate from the manager appliance.

6. A computer security system comprising non-transitory media encoded with code that, when executed by a processor, implements a process including:
issuing, by guest agent installed in virtual machines, alarms to host agents installed in hypervisors on which the virtual machines run, said process performed using a service-oriented architecture and using define versioned hyper text transfer protocol (HTTP) application program interfaces (APIs), said process further providing explicit distinction between stateful and stateless components, and between stateful and stateless infrastructure within said stateful and stateless components;
consolidating, by the host agents, across alarms received from different virtual machines running on the same hypervisor;
pushing consolidated alarms from host agents to a manager appliance residing at the same computer site as the hypervisors;
batching, by the manager appliance, consolidated alarms received from different hypervisors, the batching occurring over a time window;
pushing, by the manager appliance to a cloud-based manager separate from the computer site, the batched alarms; and
notifying, by the cloud-based manager, an administrator of the alarms.

7. The computer process of claim 6 wherein the process further includes, prior to the notifying, deduplicating, by the cloud-based manager, the batched alarms.

8. The computer process of claim 7 further comprising:
pulling, by the manager appliance, remediations from the cloud-based manager; and
pushing, by the manager appliance, remediations to a site manager at the computer site and separate from the manager appliance.

9. The computer system of claim 8 wherein the remediations include suspensions of virtual machines.

10. The computer system of claim 8 wherein the process further includes pushing remediations including quarantines to a network manager at the computer site and separate from the manager appliance.

* * * * *